US008103634B2

(12) United States Patent  (10) Patent No.: US 8,103,634 B2
Saito  (45) Date of Patent: Jan. 24, 2012

(54) DOCUMENT MANAGEMENT SYSTEM, DOCUMENT MANAGEMENT DEVICE, DOCUMENT MANAGEMENT METHOD AND RECORDING MEDIUM STORING A DOCUMENT MANAGEMENT PROGRAM

(75) Inventor: Kazuo Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 406 days.

(21) Appl. No.: 12/105,760

(22) Filed: Apr. 18, 2008

(65) Prior Publication Data

US 2009/0106249 A1  Apr. 23, 2009

(30) Foreign Application Priority Data

Oct. 18, 2007  (JP) .................................. 2007-271454

(51) Int. Cl.
*G06F 7/00* (2006.01)
*G06F 17/00* (2006.01)

(52) U.S. Cl. ....................................... 707/661
(58) Field of Classification Search ........................ None
See application file for complete search history.

(56) References Cited

U.S. PATENT DOCUMENTS

2005/0168766 A1* 8/2005 Troyansky et al. .......... 358/1.14
2006/0133670 A1* 6/2006 Barrus et al. ................. 382/173
2007/0283417 A1* 12/2007 Smolen et al. ............... 726/2

FOREIGN PATENT DOCUMENTS

JP  A-2005-038371  2/2005

OTHER PUBLICATIONS

107th Congress, Public Law 107-204 (aka Sarbanes-Oxley Act), Jul. 30, 2002, Government Printing Office, 116 STAT. 745, section 103.*
Drop Table, 2002, Oracle Corporation, http://download.oracle.com/docs/cd/B10501_01/server.920/a96540/statements_94a.htm#2061308 (Accessed Jul. 26, 2010).*
Davis et al., Secondary Key Retrieval Using an IBM 7090-1301 System, 1965, ACM, vol. 8 No. 4, 243-246.*

* cited by examiner

*Primary Examiner* — Pierre Vital
*Assistant Examiner* — Jason Liao
(74) *Attorney, Agent, or Firm* — Oliff & Berridge, PLC

(57) ABSTRACT

A document management system includes a management device that manages operation limiting information for limiting an operation of a document, and a document operation device that operates the document, in which the document operation device is provided with an invalidation request portion that requests invalidation of the document, and the management device is provided with an operation historical management portion that manages an operation history of a document for managing the operation limiting information, a related document retrieval portion that retrieves a related document related to the document according to the operation history managed by the operation historical management portion in response to the document invalidation request by the invalidation request portion, and an invalidation portion that sets invalidation information in operation limiting information on a document related to the invalidation request and a related document retrieved by the related document retrieval portion and invalidates the document related to the invalidation request and the related document.

21 Claims, 25 Drawing Sheets

| | 901 | 902 | 903 | 904 | 905 | 906 | 907 | 908 |
|---|---|---|---|---|---|---|---|---|
| | DOCUMENT ID | DERIVATION SOURCE DOCUMENT ID | POLICY ID | DOCUMENT NAME | MEDIUM TYPE | CREATOR ID | CREATED DATE AND TIME | INVALIDATED DATE AND TIME |
| | 40ffaaa4-ofb6-4634-85bf-bba45bc941b5 | (ROOT DOCUMENT ID) | 0001 | INTERNAL MATERIAL | ELECTRONIC | Fx12345 | 2007-01-20 10:00 | (NO INVALIDATION) |
| | 4FB6BB00-3347-11d0-B40A-00A005FF586 | (ROOT DOCUMENT ID) | 0002 | Mode12006 CATALOG | ELECTRONIC | Fx19810 | 2006-10-01 10:00 | (NO INVALIDATION) |
| | AED6483F-3304-11d2-86F1-006008B0E5D2 | 4FB6BB00-3347-11d0-B40A-00A005FF586 | – | – | PAPER | Fx25615 | 2006-10-03 14:23 | 2006-11-01 12:23 |
| | FDF9C30D-CCAB-3E2D-B584-9E24CE8038E3 | AED6483F-3304-11d2-86F1-006008B0E5D2 | – | – | PAPER | Fx16982 | 2006-10-10 16:32 | 2006-11-01 12:13 |
| | . . . | . . . | . . . | . . . | . . . | . . . | . . . | . . . |

FIG. 8

| POLICY ID | POLICY NAME | USAGE RANGE | EFFECTIVE PERIOD | PERMISSION FUNCTION LIST |
|---|---|---|---|---|
| 0001 | SOFTWARE DEVELOPMENT DEPARTMENT INTERNAL MATERIAL | BELONGING ORGANIZATION NAME: DEVELOPMENT HEAD OFFICE | WITHIN 60 DAYS AFTER GENERATION | PERMISSION: BROWSING OF ELECTRONIC DOCUMENT |
| | | BELONGING ORGANIZATION NAME: SOFTWARE DEVELOPMENT DEPARTMENT | WITHIN 180 DAYS AFTER GENERATION | PERMISSION: BROWSING OF ELECTRONIC DOCUMENT PRINTING OF ELECTRONIC DOCUMENT COPY OF PAPER DOCUMENT |
| | | CREATOR | UNLIMITED | PERMISSION: BROWSING OF ELECTRONIC DOCUMENT EDITING OF ELECTRONIC DOCUMENT PRINTING OF ELECTRONIC DOCUMENT COPYING OF PAPER DOCUMENT SCANNING OF PAPER DOCUMENT |
| 0002 | MATERIAL FOR SALES | UNLIMITED | WITHIN 30 DAYS AFTER GENERATION | PERMISSION: BROWSING OF ELECTRONIC DOCUMENT |
| | | BELONGING ORGANIZATION NAME: SALES DEPARTMENT | WITHIN 180 DAYS AFTER GENERATION | PERMISSION: BROWSING OF ELECTRONIC DOCUMENT EDITING OF ELECTRONIC DOCUMENT PRINTING OF ELECTRONIC DOCUMENT COPYING OF PAPER DOCUMENT |
| | | CREATOR | UNLIMITED | PERMISSION: BROWSING OF ELECTRONIC DOCUMENT EDITING OF ELECTRONIC DOCUMENT PRINTING OF ELECTRONIC DOCUMENT COPYING OF PAPER DOCUMENT SCANNING OF PAPER DOCUMENT |
| ... | ... | ... | ... | ... |

| DOCUMENT ID | DERIVATION SOURCE DOCUMENT ID | POLICY ID | DOCUMENT NAME | MEDIUM TYPE | CREATOR ID | CREATED DATE AND TIME | INVALIDATED DATE AND TIME |
|---|---|---|---|---|---|---|---|
| 40ffaaa4-0fb6-4634-85bf-bba45bc941b5 | (ROOT DOCUMENT ID) | 0001 | INTERNAL MATERIAL | ELECTRONIC | Fx12345 | 2007-01-20 10:00 | (NO INVALIDATION) |
| 4FB6BB00-3347-11d0-B40A-00A005FF586 | (ROOT DOCUMENT ID) | 0002 | Model2006 CATALOG | ELECTRONIC | Fx19810 | 2006-10-01 10:00 | (NO INVALIDATION) |
| AED6483F-3304-11d2-86F1-006008B0E5D2 | 4FB6BB00-3347-11d0-B40A-00A005FF586 | - | - | PAPER | Fx25615 | 2006-10-03 14:23 | 2006-11-01 12:23 |
| FDF9C30D-CCAB-3E2D-B584-9E24CE8038E3 | AED6483F-3304-11d2-86F1-006008B0E5D2 | - | - | PAPER | Fx16982 | 2006-10-10 16:32 | 2006-11-01 12:13 |
| ... | ... | ... | ... | ... | ... | ... | ... |

901 902 903 904 905 906 907 908

DOCUMENT MANAGEMENT SYSTEM, DOCUMENT MANAGEMENT DEVICE, DOCUMENT MANAGEMENT METHOD AND RECORDING MEDIUM STORING A DOCUMENT MANAGEMENT PROGRAM

CROSS-REFERENCE TO RELATED APPLICATIONS

This application is based on and claims priority under 35 USC 119 from Japanese Patent Application No. 2007-271454 filed on Oct. 18, 2007.

BACKGROUND

1. Technical Field

The present invention relates to a document management system, a document management device, a document management method and a recording medium storing a document management program.

2. Related Art

There is a system which performs management of an electronic document and a paper document according to a predetermined security policy. This system sets policy information according to the security policy for the document to be handled, thereby controlling to allow only an authorized user to perform an operation allowed by the policy information. In other words, an unauthorized operation by an unauthorized user is rejected, and only an authorized user can perform the set operation according to the policy information.

This policy information can make invalidation setting to prohibit all operations on the document itself and since the document whose invalidation is set becomes a document not subjected to the operation, it is controlled to reject all the operations with information related to the document deleted from the managed object or the information about the document being managed.

SUMMARY

According to an aspect of the present invention, a document management system Includes a management device that manages operation limiting information for limiting an operation of a document, and a document operation device that operates the document, in which the document operation device is provided with an invalidation request portion that requests invalidation of the document, and the management device is provided with an operation historical management portion that manages an operation history of a document for managing the operation limiting information, a related document retrieval portion that retrieves a related document related to the document according to the operation history managed by the operation historical management portion in response to the document invalidation request by the invalidation request portion, and an invalidation portion that sets invalidation information in operation limiting information on a document related to the invalidation request and a related document retrieved by the related document retrieval portion and invalidates the document related to the invalidation request and the related document.

BRIEF DESCRIPTION OF THE DRAWINGS

Exemplary embodiments of the present invention will be described in detail based on the following figures, wherein:

FIG. 8 is a table structure diagram showing policy information;

FIG. 9 is a table structure diagram showing document information;

DETAILED DESCRIPTION

An embodiment of a document management system, a document management device, a document management method and a recording medium storing a document management program according to the present invention is described in detail below with reference to the accompanying drawings.

Embodiment

Figure 1:
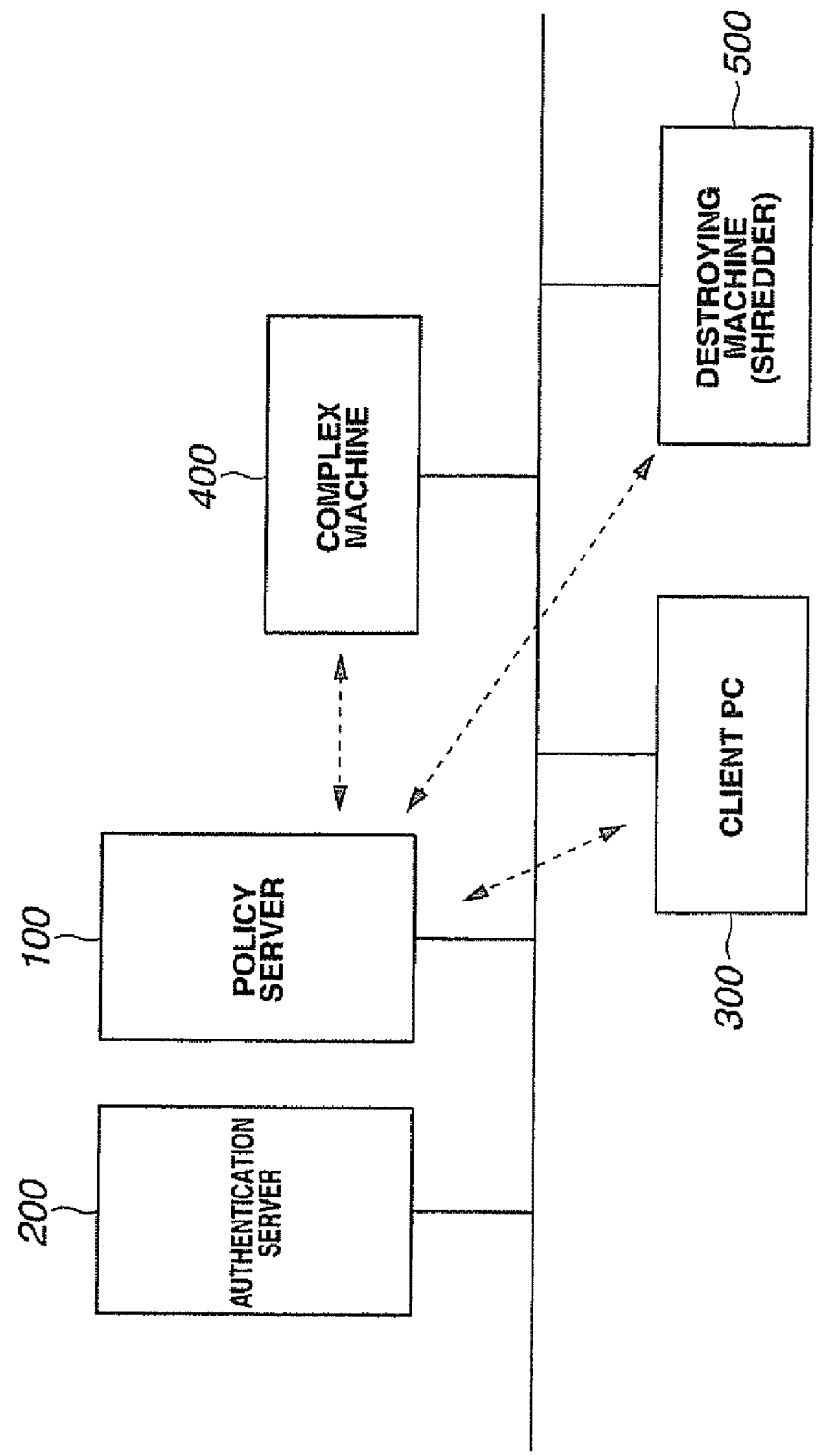
FIG. 1 is an example of a system configuration chart of a document management system configured by applying a document management device and a program according to an embodiment of the present invention.

FIG. 1 is an example of a system configuration chart of the document management system configured by applying the document management system and program according to the present invention.

In FIG. 1, this document management system is comprised of a policy server 100, an authentication server 200, a client PC 300, a complex machine 400 and a destroying machine 500 (hereinafter called as the "shredder 500").

The policy server 100 is a device for managing the policy information which is applied to an electronic document and a paper document to be operated according to the security policy.

The security policy indicates a policy and standards to eliminate risk factors to the document and to secure the secrecy of the document, and the policy information indicates a confidential level of the security policy. In other words, the policy information is applied to the document to prevent information leak and unauthorized access from occurring.

For example, as the security policy to prevent the information leak, unauthorized access or the like, there are a use permitted, operation authority and the like, which are specified in the policy information and set on the document to restrict the operation of the document. Therefore, the policy information is also expressed as "operation limiting information".

The policy information can to set the invalidation of the operation, and a document to which applied is the policy information having the invalidation of operation set falls in a state that all the operations are invalidated.

The document to which the policy information is applied and which is in the protected state is indicated below as a "protected document".

The protected document can be classified into two types depending on whether a medium is electronic or paper and, whichever medium is used, a document ID for uniquely identifying the protected document is give for its management. The protected document which is created by applying the policy information to the electronic document is indicated as "protected electronic document", and the protected document which is created by applying the policy information to the paper document is indicated as "protected paper document". The protected paper document is created by the complex machine 400. Examples of the protected electronic document and the protected paper document are shown in FIGS. 2A though 2C.

The protected electronic document and the protected paper document (hereinafter collectively referred to as "protected document") are provided with a document ID (also called "document identification information") for identifying the documents, and the policy server 100 manages the policy information applied to the document ID.

The policy server 100 manages the document information on the protected document in addition to the policy information. The document information manages related information among documents and, when a new document is created from a certain protected document, manages the created document and the generation source document in association with each other. In other words, the two documents have a derived relationship.

In this embodiment, the policy server manages all the documents in association with the policy information but may be configured to manage only the derived relationship without managing the policy information. In such a case, the operation of the document is not limited, but when the document is invalidated, it cannot be operated.

The authentication server 200 is comprised of an LDAP (Lightweight Directory Access Protocol) server an AD (Active Directory) server or the like and manages information for authenticating the user who is a document operator. For example, the authentication server 200 manages a combination of a user ID and a password for identifying the user and authenticates the user if the combination of the user ID and the password included in the user authentication request agrees with the former combination.

The authentication server 200 manages user information such as a user name, a belonging group, registered date and time and the like of the user who is identified by the user ID and uses it for identification of the policy information applied to the document by the policy server 100.

The client PC 300 is a device for performing various document operations such as browsing, editing, printing request, name change, attribute modification and the like of the protected documents. To perform such operations of the protected document, the policy information applied to the protected document is inquired to the policy server 100, and it is judged whether or not the operations are permitted by to the policy information represented by the policy server 100 and, if permitted, the operations are performed.

The client PC 300 also performs generation processing to generate the protected document by applying the policy information to a document to which the policy information according to the security policy is not applied. When the protected document is created by this generation processing, a correspondence relation with the policy information applied to the document ID for identifying the created protected document is registered in the policy server 100.

Besides, the client PC 300 performs an invalidation processing to invalidate the operation of the protected document. This invalidation processing is a processing to set the document invalidation on the policy information applied to the protected document, and document operation of the protected document invalidated by the invalidation processing is rejected. This invalidation processing also invalidates the related document which is related to the protected document being subjected to the invalidation processing at the same time.

At this time, the client PC 300 requests the policy server 100 for the document ID of the related document and sets the invalidate on the policy information which is applied to the document having that document ID. The processing of retrieving the policy information on the related document by the policy server 100 is shown by the flow chart of FIG. 10, and the processing of setting the invalidation in the policy information on the retrieved document ID is shown by the flow chart of FIG. 11.

The complex machine 400 provides functions of duplicating, printing, image reading, facsimile transmission and the like of the document and creates an image of the document. To realize these functions, the complex machine 400 communicates with the policy server 100 to judge whether it is possible to perform the above functions according to the policy information applied to the document to be processed.

In a case where the protected electronic document is processed, the document ID indicated on the protected electronic document is read, and it is judged whether or not the processing demanded for the document ID is permitted by the policy information applied to the document ID. In a case where the protected paper document is processed, the document ID is read and decoded by an image reading function, and it is judged whether or not it is permitted by the policy information applied to the document ID.

The complex machine 400 also performs invalidation processing of the protected paper document. The invalidation processing sets invalidation in the policy information on the document ID for identifying the protected paper document in the same manner as the protected electronic document. Similar to the invalidation processing by the client PC 300, the document related to the protected paper document to be invalidated is retrieved, and the retrieved related document is also invalidated.

Incidentally, the protected paper document invalidated by the invalidation processing is destroyed by a shredder function which is also provided to the complex machine 400.

The document management system is a system which similarly invalidates another protected document related to the protected document when the protected document to which the policy information is applied is invalidated.

Figure 2C:
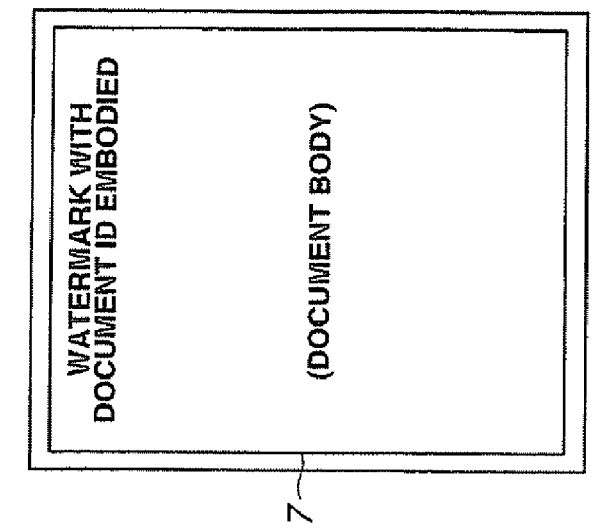
FIGS. 2A to 2C are diagrams showing states of protected documents to which policy information is applied by the document management device of the document management system according to the embodiment of the present invention.
Figure 2B:
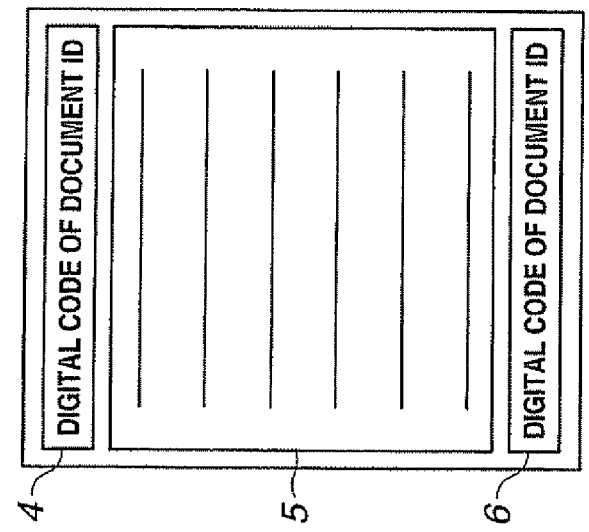
Figure 2A:
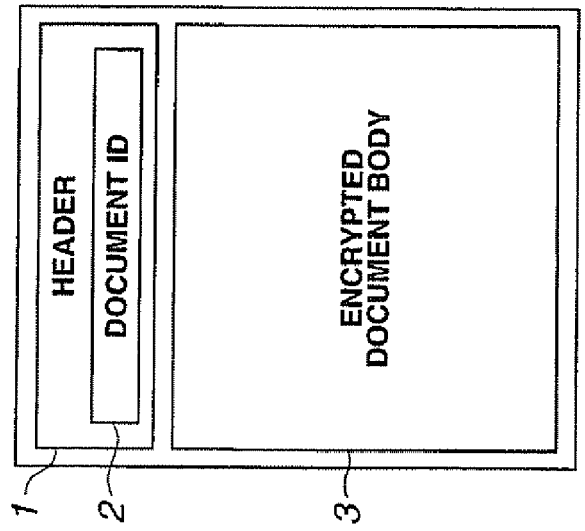

FIGS. 2A through 2C are diagrams showing the states of the protected document to which the policy information is applied by the document management device according to the embodiment of the present invention.

FIG. 2A is a diagram showing an example of the protected electronic document with respect to the electronic document, and FIG. 2B and FIG. 2C are diagrams showing examples of the protected paper document with respect to the paper document.

The protected electronic document shown in FIG. 2A has a structure which is comprised of a document header 1 and an encrypted document body 3 and the document header 1 includes a document ID 2 for identifying the document.

The document is identified by the document ID 2, and the policy information applied to the document ID 2 is managed by the policy server 100. The encrypted document body 3 is a body of the document which is in a state encrypted by an encryption key. The encryption key here is a common encryption key but not limited to it, and the encryption key may be updated for each document.

FIG. 2B shows a document in a state that a digital code including a document ID is printed at the top and end of a paper document. To perform an operation such as scanning, duplicating, facsimile transmission or the like of this paper document by the complex machine 400, the document ID is read from the printed digital code, and the policy information managed by the policy server 100 is applied to the document ID. Examples of the digital code include a bar code and a two-dimensional bar code.

Besides, FIG. 2C is a document with a document ID embodied in the entire document by applying watermark technology and, when the complex machine 400 is used to perform an operation such as scanning, duplicating, facsimile transmission or the like similar to the document shown in FIG. 2B, the complex machine 400 reads the document ID from the document and applies the policy information managed by the policy server 100 to the document ID.

Figure 3:
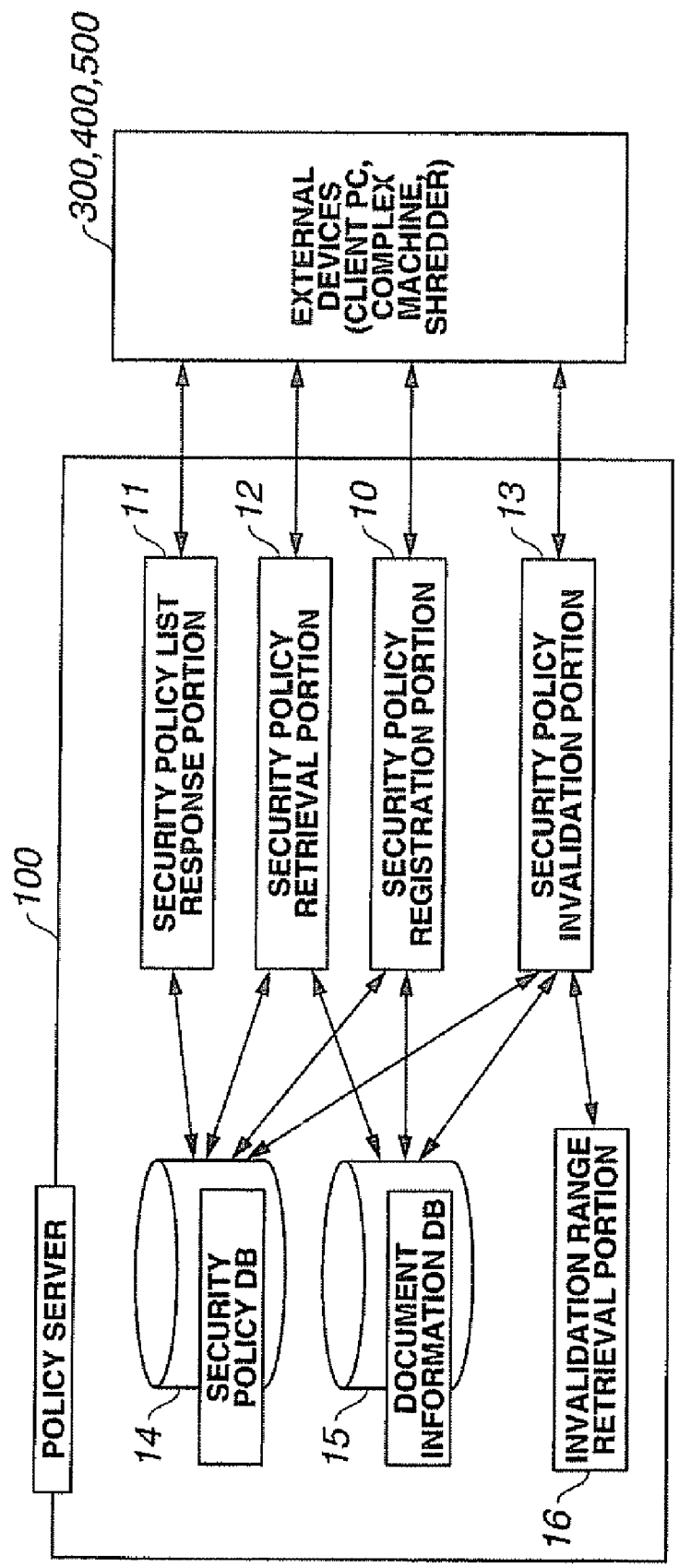
FIG. 3 is a block diagram showing a detail structure of the policy server shown in FIG. 1.

FIG. 3 is a block diagram showing a detail structure of the policy server shown in FIG. 1.

The policy server 100 shown in FIG. 3 is comprised of a security policy registration portion 10, a security policy list response portion 11, a security policy retrieval portion 12, a security policy invalidation portion 13, a security policy DB 14, a document information DB 15 and an invalidation range retrieval portion 16. And, the security policy registration portion 10, the security policy list response portion II the security policy retrieval portion 12 and the security policy invalidation portion 13 perform data communications with the client PC 300, the complex machine 400 and the shredder 500.

The security policy DB 14 manages the policy information applied to the document. Its example is shown in FIG. 8, the document information DB 15 manages information on the document which is subjected to the operation, and its example is shown in FIG. 9.

First, FIG. 8 is described.

The policy information shown in FIG. 8 is in the form of a table structure and configured of a [policy ID] item 801, a [policy name] item 802, a [usage range] item 803, an [effective period] item 804 mid a [permission function list] item 805.

The [policy ID] item 801 is identification information for identifying, the policy information, and the [policy name] item 802 is information showing policy information names.

The [usage range] item 803 is information showing a range to which the user who operates the document of the identification information indicated by the [policy ID] item 801 is pertinent. For example, if a user group is designated, it indicates a range that the user belonging to the user group is allowed to operate the document and, if a particular user is designated, it indicates a range that only the user is allowed to operate the document.

The [effective period] item 804 is information showing the effective period of the policy information of each range of the user indicated by the [usage range] item 803, designating, for example, an effective period of days elapsed from the generation of the document.

The [permission function list] item 805 is information showing a list of permitted operations and indicated for each medium of the document subjected to the operation. For example, it is designated so that if the medium is an electronic document, its browsing and printing are possible, and if the medium is paper, its duplicating (copy) can be made.

In a case where the policy information on policy ID "0001" is applied to a certain document, the user authenticated by communication with the authentication server 200 is "user A" and it is judged that the user A belongs to the "software development department", the policy table of FIG. 8 shows that the user A can perform "browsing and printing" of the electronic document for only "180 days or less" from the generation of the document and can "duplicate (copy)" the paper document.

Similarly, in a case where the policy information on policy ID "0002" is applied to a certain document, the user authenticated by communication with the authentication server 200 is "user B" and it is judged that the document that the user B is a "creator" is operated, the policy table of FIG. 8 shows that the user B can perform respective operations of "browsing, editing and printing" of the electronic document without limitation of the period, aid respective operations of "duplicating (copying) and scanning" of the paper document.

Then, FIG. 9 is described.

The document information shown in FIG. 9 is in the form of a table structure and configured of a [document ID] item 901, a [derivation source document ID] item 902, a [policy ID] item 903, a [document name] item 904, a [medium type] item 905, a [creator ID] item 906, a [created date and time] item 907 and a [invalidated date and time] item 908.

The [document D] item 901 is information for identifying the document subjected to the operation, showing an example expressed in hexadecimal. The [derivation source document ID] item 902 is information for identifying the document which has become a derivation source, showing an example expressed in hexadecimal similar to the document ID shown in the [document ID] item 901. If the [derivation source document ID] item 902 does not indicate a derivation source document ID (when "-" is shown), it means that the document is a root document.

The [policy ID] item 903 is identification information for identifying the policy information applied to the document, and any of the policy IDs shown in the [policy ID] item 801 shown in FIG. 8 is indicated.

The [document name] item 904 is information showing a document name, the [medium type] item 905 is information showing a document medium, the [creator ID] item 906 is information identifying a creator who has generated the document identified by the [document ID] item 901.

Besides, the [created date and time] item 907 is information indicating date and time when the document was generated, and the [invalidated date and time] item 908 is information indicating a date and time when the invalidation processing was performed. If the [invalidated date and time] item 908 indicates a date and time, it means that the document is invalidated.

It is judged that the document identified by document ID "40ffaaa4-0fb6-4634-85bf-bba45bc941b5" shown in the [document ID] item 901 of FIG. 9 does not have a root document of the derivation source because the [derivation source document ID] item 902 is "-", and it is indicated that the policy information identified by the policy ID "0001" shown in the [policy ID] item 903 is applied.

The document name of this document is "internal material" as indicated by the [document name] item 904 and configured of an "electronic" medium as shown in the [medium type] item 905. Besides, this document is a document which is generated at "10:00 on Jan. 20, 2007" indicated by "2007-01-20 10:00" shown in the [created date and time] item 907 by a creator "Fx12345" shown in the [creator ID] item 906 and not invalidated because the [invalidated date and time] item 908 is "-". In other words, it is a document which can be operated.

The document identified by document ID "AED6483F-3304-11d2-86F1-006008B0E5D2" shown in the [document ID] item 901 of FIG. 9 is judged that its parent document which is a source of this document is a document identified by "4FB6BB003347-11d0-B40A-00A005FF586" because the [derivation source document ID] item 902 is "4FB6BB003347-11d0-B40A-00A005FF586".

Both the [policy ID] item 903 and the [document name] item 904 are "-" indicating that policy information is not applied and the document name is not set either.

But, the [policy ID] item 903 is in a state with a value not set, but this document is judged to be a derived document by the policy server 100, so that the policy ID which is applied to the document is specified by following the derivation source document. In this case, since "0002" is set as the [policy ID] item 903 for the parent document "4FB6BB003347-11d0-B40A-00A005FF586", it is judged that the policy information indicated by "0002" is has been set.

Besides, this document is a paper document because the [medium type] item 905 is indicated as "paper", and it is generated at "14:23 on Oct. 32, 2006" as indicated by "2006-10-03 14:23" shown in the [created date and time] item 907 by a creator "Fx25615" shown in the [creator ID] item 906. Besides, since the [invalidated date and time] item 908 is "2006-11-01 12:13", it is indicated to be a document which is in a state invalidated at "12:13 on Nov. 1, 2006". In other words, if it is tried to operate this document, it is rejected and destroyed.

Thus, the security policy DB 14 shown in FIG. 3 manages policy information, and the document information DB 15 manages document information.

Subsequently, a protected document is generated by a external device such as the client PC 300, so that the security policy registration portion 10 shown in FIG. 3 performs processing to register the document information on the protected document. Information such as document ID, derivation source document ID, policy ID, document name, medium type, creator ID and a created date and time are designated as the document information on the protected document from the external device.

At this time, an example of a registration request for the document information received from the client PC 300 is shown below in an XML (Extensible Markup Language) format. The left ends of individual steps of the XML indicate line numbers
used for description.

```
01 <PolicyRegister>
02 <Document ID>4FB6BB00-3347-11d0-B40A-
   00A005FF586</Document ID>
03 <PolicyID>0002</PolicyID>
04 <DocumentName>Model2006Catalog</DocumentName>
05 <Type>electronic</Type>
06 <UserID>Fx19810</UserID>
07 <Date>2006-10-01 T10:00+09:00</Date>
08 </PolicyRegister>
```

Line 01 and line 08 show a tag element <PolicyRegister> indicating a registration request for the policy information. And, the contents of document information to be registered are shown as values of the tag element <PolicyRegister> from line 02 to line 07.

Line 02 indicates a document ID by a tag element <Document ID> and indicates that the document ID is FB6BB00-3347-11d0-B40A-00A005FF586". Line 03 indicates a policy ID, which is applied to a document, as a tag element <PolicyID> and indicates that its policy ID is "0002". Line 04 indicates a document name by a tag element <DocumentName> and indicates that the document name is "Model2006Catalog".

Line 05 indicates a medium type by a tag element <Type> and indicates "electronic" as its value to indicate it is an electronic document. Line 06 indicates a tag element <UserID> and indicates that a protected document is generated by a creator identified by "Fx19810", and line 07 indicates a tag element <Date> and indicates that a protected document is generated at "10:00 on Oct. 1, 2006" as indicated by "2006-10-01 T10:00+09:00".

The security policy registration portion 10 having received the above information registers them in the document information table managed by the document information DB 15. An example of the document information table here is shown on a record (909) that the document ID of FIG. 9 is "4FB6BB00-3347-11d0-B40A-00A005FF586". The [invalidated date and time] item 908 of this record (909) becomes "-(empty)" to indicate that the invalidation processing has not been performed. In this example, there is no derivation source document, and described below is a case that there is a derivation source document.

```
01 <PolicyRegister>
02 <Document ID> AED6483F-3304-11d2-86F1-
   006008B0E5D2</Document ID>
03 <DerivateFrom>4FB6BB003347-11d0-B40A-
   00A005FF586</DerivateFrom>
04 <Type>paper</Type>
05 <UserID>Fx25615</UserID>
06 <Date>2006-10-03 T14:23+09:00</Date>
07 </PolicyRegister>
```

In a case where there is a derivation source document, the derivation source document is designated by a tag element <DerivedFrom> instead of the tag element <PolicyID> as described above.

Thus, the document information on the protected document is registered by the security policy registration portion 10.

In response to a list inquiry for the policy information applicable to the document from the external device such as the client PC 300, the complex machine 400 or the shredder 500, the security policy list response portion 11 responses to the requesting source requesting source a list of policy information generated by obtaining the pertinent policy information from the policy information managed by the security policy DB 14.

At this time, an example of the list of policy information responded which is indicated in the XML format is shown below. Line numbers to be used for illustration are indicated at the left ends of the individual steps of the XML.

```
01 <Polices>
02 <Policy>
03 <PolicyID>0001</PolicyID>
04 <Name>Software Development Department Internal Material</Name>
05 <AccessRight>
06 <Users>
07 <Group>Development Head Office</Group>
08 </Users>
09 <ValidTerm>60days from creation</ValidTerm>
10 <Operation>
11 <View/>
12 </Operation>
13 </AccessRight>
14 <AccessRight>
15 <Users>
16 <Group>Software Development Department</Group>
17 </Users>
18 <ValidTerm>180days from creation</ValidTerm>
19 <Operation>
20 <View/>
21 <Print/>
99 <Copy/>
23 </Operation>
```

-continued

```
24 </AccessRight>
25 <AccessRight>
26 <Users>
27 <user>Owner</user>
28 </Users>
29 <ValidTerm></ValidTerm>
30 <Operation>
31 <View/>
32 <Print/>
33 <Copy/>
34 <Edit/>
35 <Scan/>
36 </Operation>
37 </AccessRight>
38 </Policy>
39 <Policy>
40 <PolicyID>0002</PolicyID>
41 <Name>Material for Sales</Name>
42 <AccessRight>
43 <Users>
44 <user>everything</user>
45 </Users>
46 <ValidTerm>30days from creation</ValidTerm>
47 <Operation>
48 <View/>
49 </Operation>
50 </AccessRight>
51 <AccessRight>
52 <Users>
53 <Group>Sales Department</Group>
54 </Users>
55 <ValidTerm>180days from creation</ValidTerm>
56 <Operation>
57 <View/>
58 <Edit/>
59 <Copy/>
60 </Operation>
61 </AccessRight>
62 <AccessRight>
63 <Users>
64 <user>Owner</user>
65 </Users>
66 <ValidTerm></ValidTerm>
67 <Operation>
68 <View/>
69 <Print/>
70 <Copy/>
71 <Edit/>
72 <Scan/>
73 </Operation>
74 </AccessRight>
75 </Policy>
76 </Polices>
```

A tag element <Polices> shown at lines 1 and 76 is a tag element showing a list of policy information, indicating that a single or plurality of policy information is designated. This list of XML type policy information shows an example including two pieces of policy information and a first one is shown from line 02 to line 38, and a second one is shown from line 39 to line 75.

First, the first policy information shows a policy ID for identifying the policy information by the tag element <PolicyID> at line 03, indicating "0001" as a value of the tag element. And, line 04 shows a name of the policy information by the tag element <Name>, indicating that the name is "Software Development Department Internal Material".

Lines 05 to 37 show the detail contents of policy information on the respective user information, indicating the contents of a plurality of policy information for the user information. This XML example shows an example that the policy information for three pieces of user information is specified as a tag element <AccessRight>.

Lines 5 to 13 show the contents of the first policy information, lines 06 to 08 show user information by the tag element <Users>, and line 7 shows as a value of the tag element a group to which the user belongs by the tag element <Group>.

Besides, line 09 shows an effective period of the policy information by the tag element <ValidTerm>, and lines 10 to 12 shows an operation permitted by the tag element <Operation>, indicating that the operation is a browsing operation shown by <View/> at line 11.

In other words, the first policy information is policy information which is applied to the user belonging to the development headquarters, and the browsing operation is made possible if it is 60 days or less from the generation of the document.

Lines 14 to 24 show the contents of the second policy information, lines 15 to 17 show user information by the tag element <Users>, and line 16 shows as a value of the tag element a group to which the user belongs by the tag element <Group>.

Besides, line 18 shows an effective period of the policy information by the tan element <ValidTerm>, lines 19 to 23 show an operation permitted by the tag element <Operation>, and lines 20 to 22 show that the operation is a browsing operation, a printing operation and a duplicating operation indicated by <View/>, <Print/> and <Copy/>.

In other words, the second policy information is policy information which is applied to the user belonging to the software development department, and the browsing operation, the printing operation and the duplicating operation are made possible if it is 180 days or less from the generation of the document.

Besides, lines 25 to 37 show the contents of the third policy information, lines 26 to 28 show user information by the tag element <Users>, and line 27 identifies the user as a value of the tag element by the tag element of <user>.

Line 29 shows an effective period of policy information by the tag element <ValidTerm>, lines 30 to 36 show an operation permitted by the tag element <Operation>, and lines 31 to 35 show that the operation is a browsing operation, a printing operation, a duplicating operation, an editing operation and a reading operation indicated by <View/>. <Print/>, <Copy/>, <Edit/> and <Scan/>.

In other words, the third policy information is policy information which is applied to the user who is a creator (owner) of the document and allows a browsing operation, a printing operation, a duplicating operation, an editing operation and a reading operation regardless of the time limit.

The second policy information shown at lines 39 to 75 shows a policy ID for identifying the policy information by the tag element <PolicyID> at line 40, showing "0002" as a value of the tag element. Line 41 shows a name of the policy information by the tag element <Name>, indicating that the name is "material for sales".

Lines 42 to 74 show the detail contents of policy information for respective user information, showing the contents of a plurality of policy information with respect to the user information. This XML example shows an example of specifying the policy information corresponding to three pieces of user information.

Lines 42 to 50 show the contents of the first policy information, lines 43 to 45 show the user information by the tag element <Users>, and line 44 shows as a value of the tag element the pertinent user by the tag element <user>. Since the tag element <user> shows "everything", it indicates that it is applicable to all users.

Line 46 shows an effective period of policy information by the tag element <ValidTerm>, and lines 47 to 49 show an operation permitted by the tag element <Operation>, indicating that the operation is a browsing operation indicated by <View/> at line 48.

In other words, the first policy information is policy information which is applied to all users and allows a browsing operation if it is 30 days or less from the generation of the document.

Lines 51 to 61 show the contents of the second policy information, lines 52 to 54 show user information by the tag element <Users>, and line 53 shows as a value of the tag element a croup to which the user belongs by the tag element <Group>.

Besides, line 55 shows an effective period of the policy information by the tag element <ValidTerm>, and lines 56 to 60 show an operation permitted by the tag element <Operation>, indicating that the operation is a browsing operation, an editing operation and a duplicating operation indicated by <View/>. <Edit/> and <Copy/> at lines 57 to 59.

In other words, the second policy information is policy information which is applied to the user who belongs to sales department, allowing a browsing operation, an editing operation and a duplicating operation if it is 180 days or less from the generation of the document.

Besides, lines 62 to 74 show the contents of the third policy information, lines 63 to 65 show user information by the tag element <Users>, and line 64 identifies as a value of the tag element the user by the tag element <user>.

Besides, line 66 shows an effective period of policy information by the tag element <ValidTerm>, lines 67 to 73 show an operation to permit by the tag element <Operation>, indicating that the operation is a browsing operation, a printing operation, a duplicating operation, an editing operation and a reading operation indicated by <View/>, <Print/>, <Copy/>, <Edit/> and <Scan/> at lines 68 to 72.

In other words, the third policy information is policy information which is applied to the user who is a creator (owner) of the document, allowing a browsing operation, a printing operation, a duplicating operation, an editing operation and a reading operation regardless of the time limit.

A list of the policy information is responded to the external device.

And, when any one is selected from the list of the policy information by the external device and a request for application of policy information to the document is performed, it is received by the security policy retrieval portion 12. This application request includes the user ID of the user who is a document operator.

The security policy retrieval portion 12 having received the policy information application request inquires of the document information DB 15 about the policy ID of the policy information applied to the document. Subsequently, policy information with respect to the policy ID obtained from the document information DB 1 and the user ID of the user who has made the application request of the policy information is inquired of the security policy DB 14, and the pertinent policy information is retrieved.

It may be naturally configured to include into the application request the group ID of a group (e.g., a software development portion group or a development head office group) to which the user indicated by the user ID belongs. In this case, the group ID of the group to which the user of the user ID is separately inquired of the authentication server 200.

Thus, when the security policy retrieval portion 12 retrieves the policy information which is applied to the document, the list of the retrieved policy information is responded to the requesting source.

The responded result to the requesting source is shown below as an example indicated by the XML format. The left ends of individual steps of the XML indicate line numbers used for description.

```
01 <UsageRights>
02 <UserID>fx17691</UserID>
03 <Document ID>4FB6BB00-3347-11d0-B40A-
   00A005FF586</Document ID>
04 <Policy>
05 <PolicyID>0002</Policy>
06 <ValidTo>2007-02-20 T23:59:59+09:00</ValidTo>
07 <Operations>
08 <View/>
09 <Print/>
10 <Copy/>
11 </Operations>
12 </Policy>
13 <InvalidateDate></InvalidateDate>
14 </UsageRights>
```

Lines 01 to 14 show a tag element <UsageRights> indicating that this XML is the retrieved result of the policy information. Lines 04 and 12 show by a tag element <Policy> the policy information applicable to the user ID shown by a tag element <UserID> at line 02 and the document ID shown by a tag element <Document ID> at line 03. This example shows that only the policy information shown at lines 05 to 11 is applicable policy information.

The policy information determined to be applicable is identified by value "0002" of a tag element <PolicyID> at line 05, indicating that it is effective until an expiration date "2007-02-20 T23:59:59+09:00" indicated by a tag element <ValidTo> at line 06.

Incidentally, a tag element <InvalidateDate> shown at line 13 indicates a date and time when the document has become invalid if invalidation processing is being performed.

The security retrieval portion 12 responds a list of the above policy information to the requesting source.

Subsequently, the policy server 100 receives from the external device an invalidation request including the document ID of a document to be invalidated, a user ID and information on the document range to be invalidated and performs invalidation processing. At this time, an example of the invalidation request in the XML format is shown below. The left ends of individual steps of the XML indicate line numbers used for description.

```
01 <PolicyInvalidate>
02 <Document ID>4FB6BB00-3347-11d0-
   B40A-00A005FF586</Document ID>
03 <UserID>Fx17691</UserID>
04 <Range>all</Range>
05 </PolicyInvalidate>
```

Lines 01 and 05 show a tag element <PolicyInvalidate> indicating that this XML is an invalidation request. Line 02 shows the document ID of the document to be invalidated as a value of a tag element <Document ID>, and line 03 shows the user ID of the user having made the invalidation request as a value of a tag element <UserID>.

Line 04 shows a range (called as "invalidation range") of the document to be invalidated as a tag element <Range> and, if "all" is shown as a value of the tag element, it indicates that all related documents (a parent document and a child document) related to the document of the document ID indicated by a value of the tag element <Document ID> are collectively invalidated, and if "this" is shown, processing of invalidating only the document of the document ID indicated by a value of the tag element <Document ID> is performed.

Figure 25:
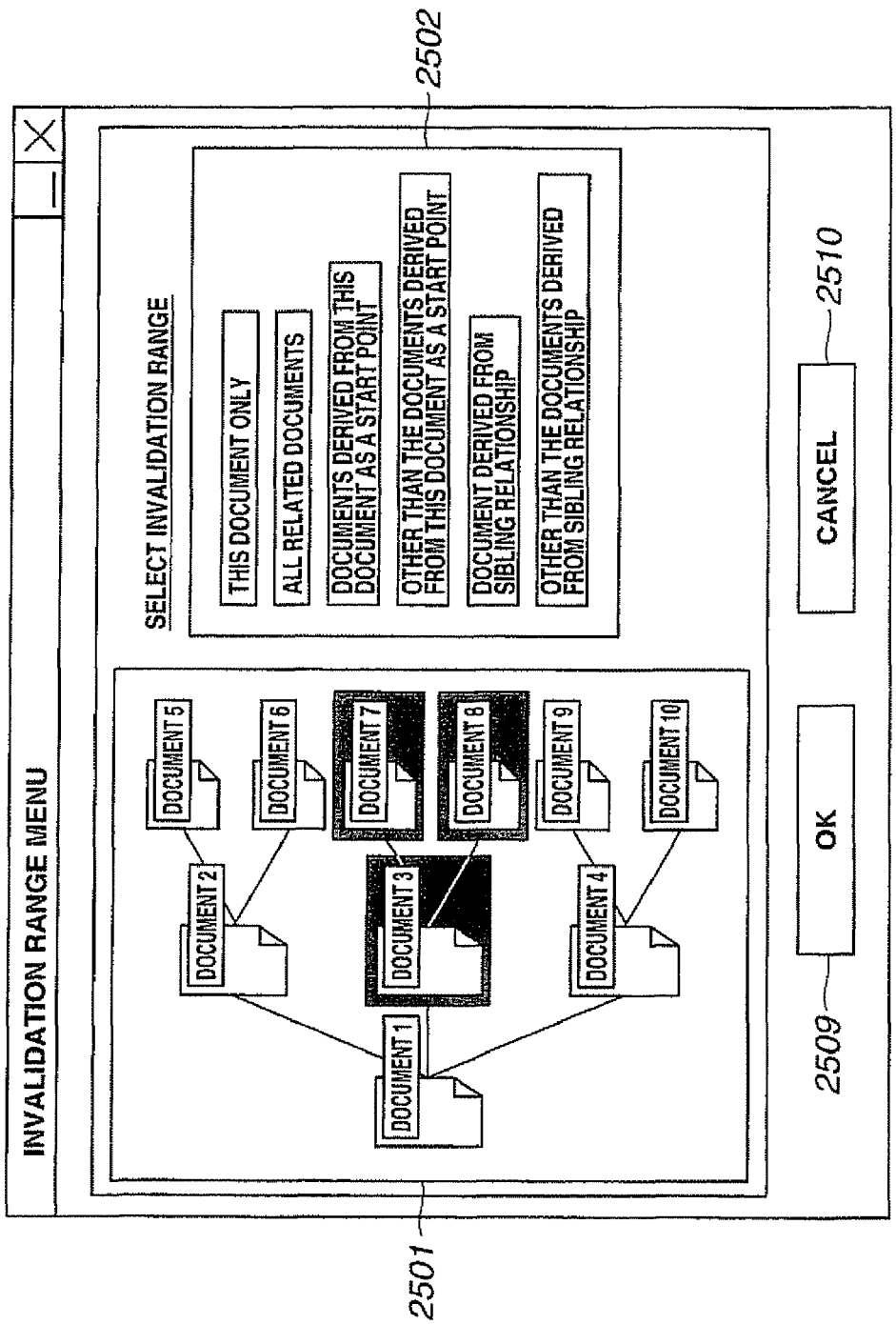
FIG. 25 is a diagram showing an example of a screen to designate a range of document to be invalidated.

Information in an invalidation range indicated as a value of a tag element <Range> is information designated on the screen of the client PC 300 as shown in FIG. 25, and a value, for example, "Condition_1" or "Condition_2" is designated other than the above-described "all" and "this".

The security policy invalidation portion 13 having received the XML invalidation request performs processing to invalidate the designated document. Therefore, a list "idList" of the document to be invalidated is generated from the document ID shown by the tag element <Document ID> at line 02 and the invalidate range information shown by the tag element at line 04.

The document ID of the document included in the "idList" to be created is variable depending on the invalidation range information and, if a value of the tag element <Range> at line 04 is "all" and all related documents are designated as the documents to invalidated, the document IDs of all related documents are included.

Meanwhile, if a value of the tag element <Range> is "this" and it is designated that only the designated document is invalidated, only the document ID of the designated document is included.

In addition to the above, it is also possible to set by the invalidation range information such that only the electronic document or only the paper document is invalidated in the related documents, and it is also possible to set such that a certain document is designated according to the interrelationship of the related documents, it is determined as a starting point, and only a retroactive document (parent document) or a derived document (child document) is invalidated.

Subsequently, document information on individual document IDs of the created "idList" is obtained from the document information DB 15, and only document information with the user ID of the user having made the invalidation request is obtained. In other words, only the document creator can invalidate the document. And, document information not invalidated in the obtained document information is invalidated.

Referring to the document information shown in FIG. 9, invalidation processing is performed by registering the present time in the document information, in which a date and time is not registered in the [invalidated date and time] item 908, among the obtained document information.

In other words, it is judged whether or not the document is the invalidated document, depending on whether a date and time is registered in the [invalidated date and time] 908 of the policy information applied to the document.

This invalidation processing is not limited to the document creator, but it can be configured so that every person can perform it and also only a manager having a particular operation authority can perform.

Figure 4:
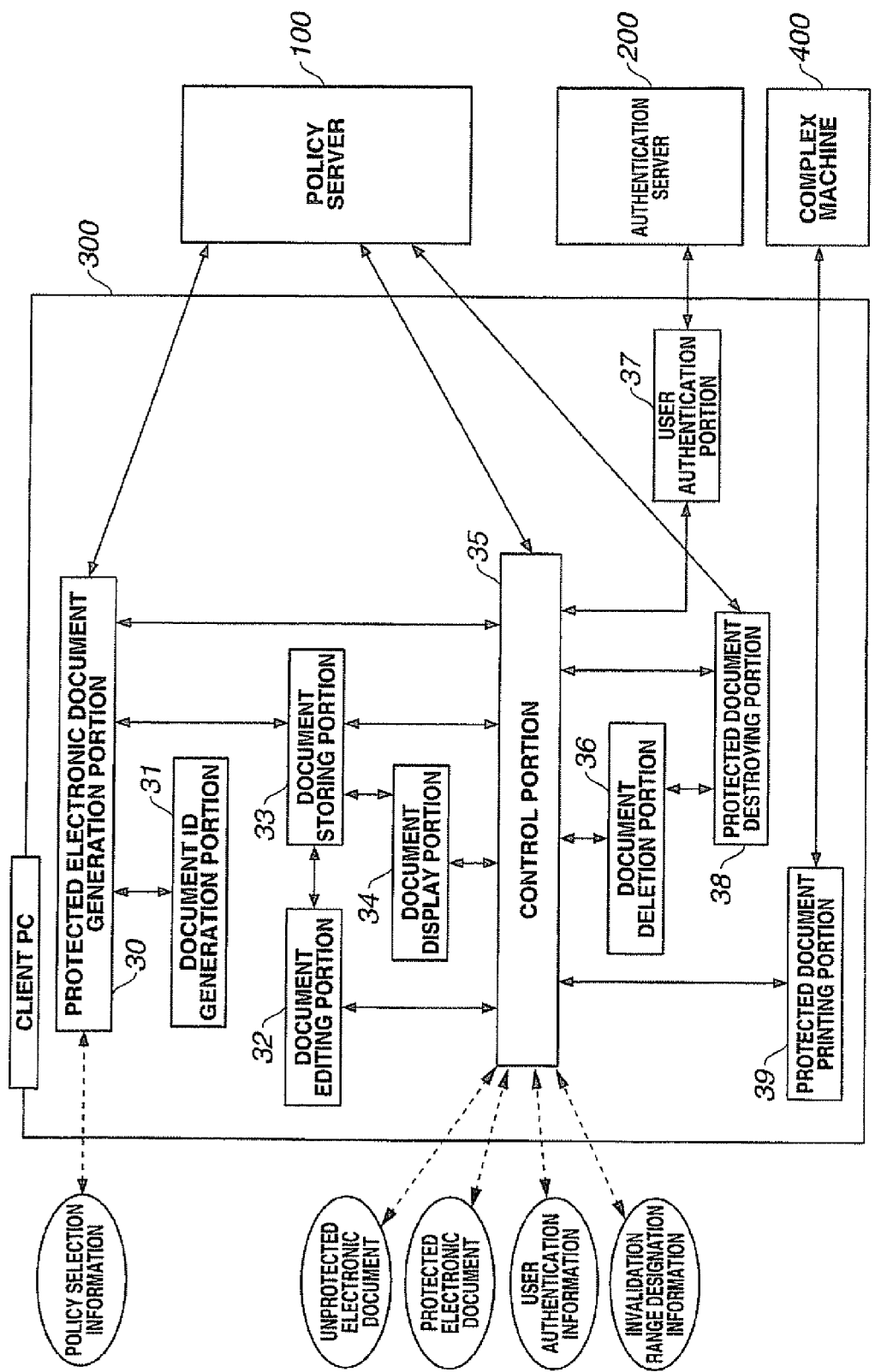
FIG. 4 is a block diagram showing a detail structure of the client PC shown in FIG. 1.

FIG. 4 is a block diagram showing a detail structure of the client PC shown in FIG. 1.

The client PC 300 shown in FIG. 4 is comprised of a protected electronic document generation portion 30, a document ID generation portion 31, a document editing portion 32, a document storing portion 33, a document display portion 34, a control portion 35, a document deletion portion 36, a user authentication portion 37, a protected document destroying portion 38 and a protected document printing portion 39.

The control portion 35 is main control of the client PC 300 and gives an instruction to other functional structure portions.

And, it receives a document operation instruction from the user and gives the instruction to another functional structure portion according to the operation instruction.

The control portion 35 having received the document operation instruction from the user makes an authenticate request to the user authentication portion 37 to authenticate the user who has made the operation instruction. The user authentication portion 37 performs processing to authenticate the user by communications with the authentication server 200. For example, the user is authenticated by a combination of the user ID and password input by the user through the user interface.

When the authentication is success, user information on the user is responded to the control portion 35.

Subsequently, when a generation request for the protected document is made by the authenticated user the control portion 35 makes a generation request for the protected document for a document to be stored in the document storing portion 33 to the protected electronic document generation portion 30 together with the authenticated user information. In the document storing portion 33, a document which is generated by using a document application or the like and to which the policy information is not applied is stored.

When the control portion 35 instructs the generation of the protected document, the protected electronic document generation portion 30 applies policy information to the document to be stored in the document storing portion 33 to generate the protected document. The policy information applied to the document is policy information selected from the list of policy information shown by the policy server 100.

The protected document to be generated by applying the policy information to the electronic document is indicated as "protected electronic document", which is a name for discrimination from the protected document which is generated by applying the policy information to the paper document, and the latter protected document is indicated as "protected paper document". This protected paper document is generated by the complex machine.

An example of the protected electronic document is the document shown in FIG. 2A, and an example of the protected paper document is the document as shown in FIG. 2B or FIG. 2C.

A document ID which is identification information for identify the document generated by the document ID generation portion 31 is set on the protected electronic document generated by the protected electronic document generation portion 30. Thus, a correspondence relationship between the document ID and the policy information is established, and the relation of the policy information to the document ID is registered in the policy server 100.

And, the generated protected electronic document is stored in the document storing portion 33.

Besides, when an operation such as browsing, editing or printing of the protected electronic document is instructed by the user the control portion 35 authenticates the user by the user authentication portion 37, transmits the protected electronic document to be stored together with the user information on the authenticated user in the document storing portion 33 to the document display portion 34, the document editing portion 32 and the protected document printing portion 39 and makes a processing instruction.

The document display portion 34, the document editing portion 32 and the protected document printing portion 39 given with the processing instruction obtain policy information, which is applied to the document, from the policy server 100 via the control portion 35, and judges whether or not the instructed processing is possible by the policy information.

If the processing is possible, the protected electronic document is decoded, the document display portion 34 shows the document, the document editing portion 32 allows the operation by the user, and the protected document printing portion 39 transmits a document printing request to the complex machine 400.

Figure 14:
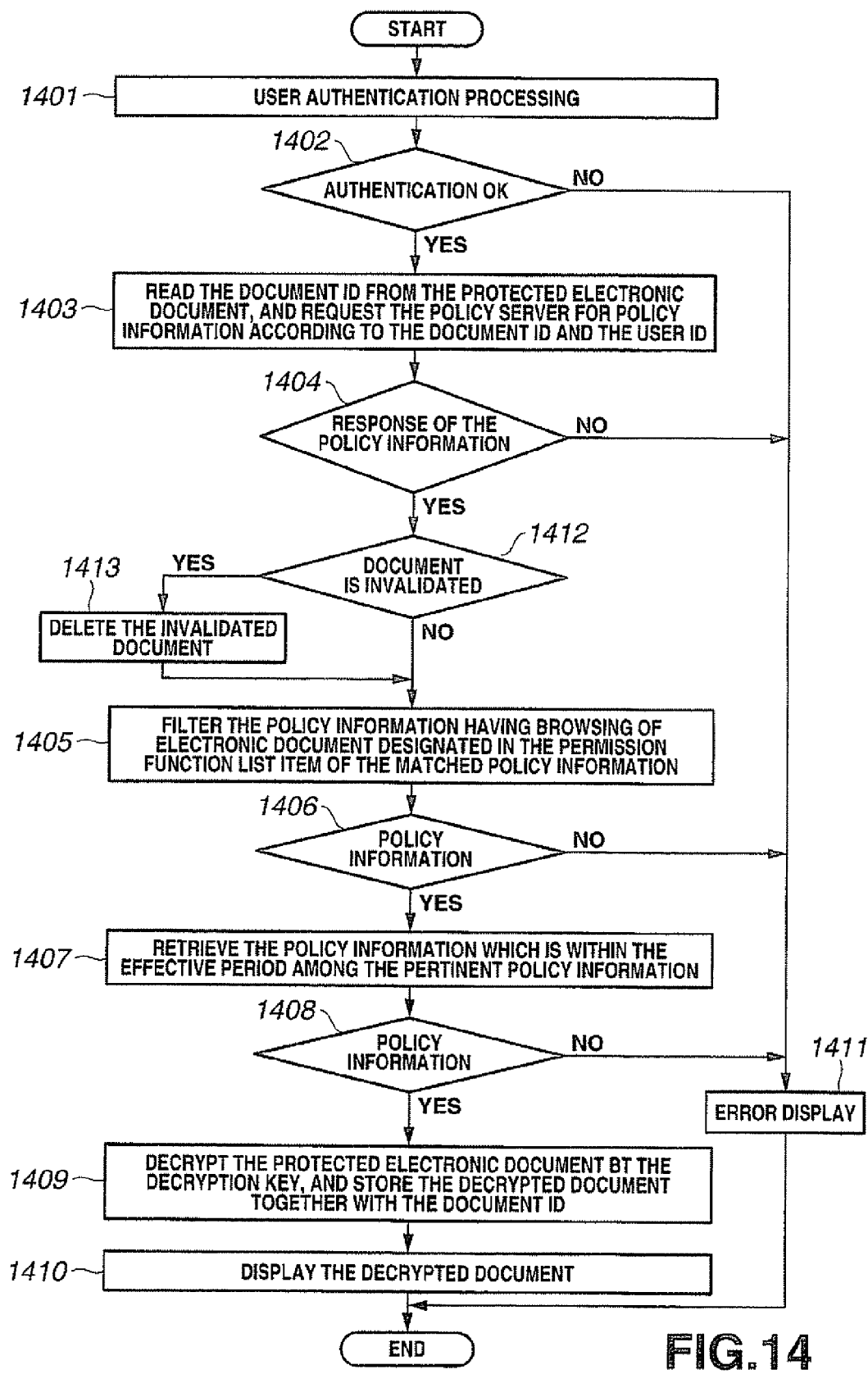
FIG. 14 is a flow chart showing a flow of processing to brows a protected electronic document by the client PC of the document management system according to the embodiment of the present invention.
Figure 15:
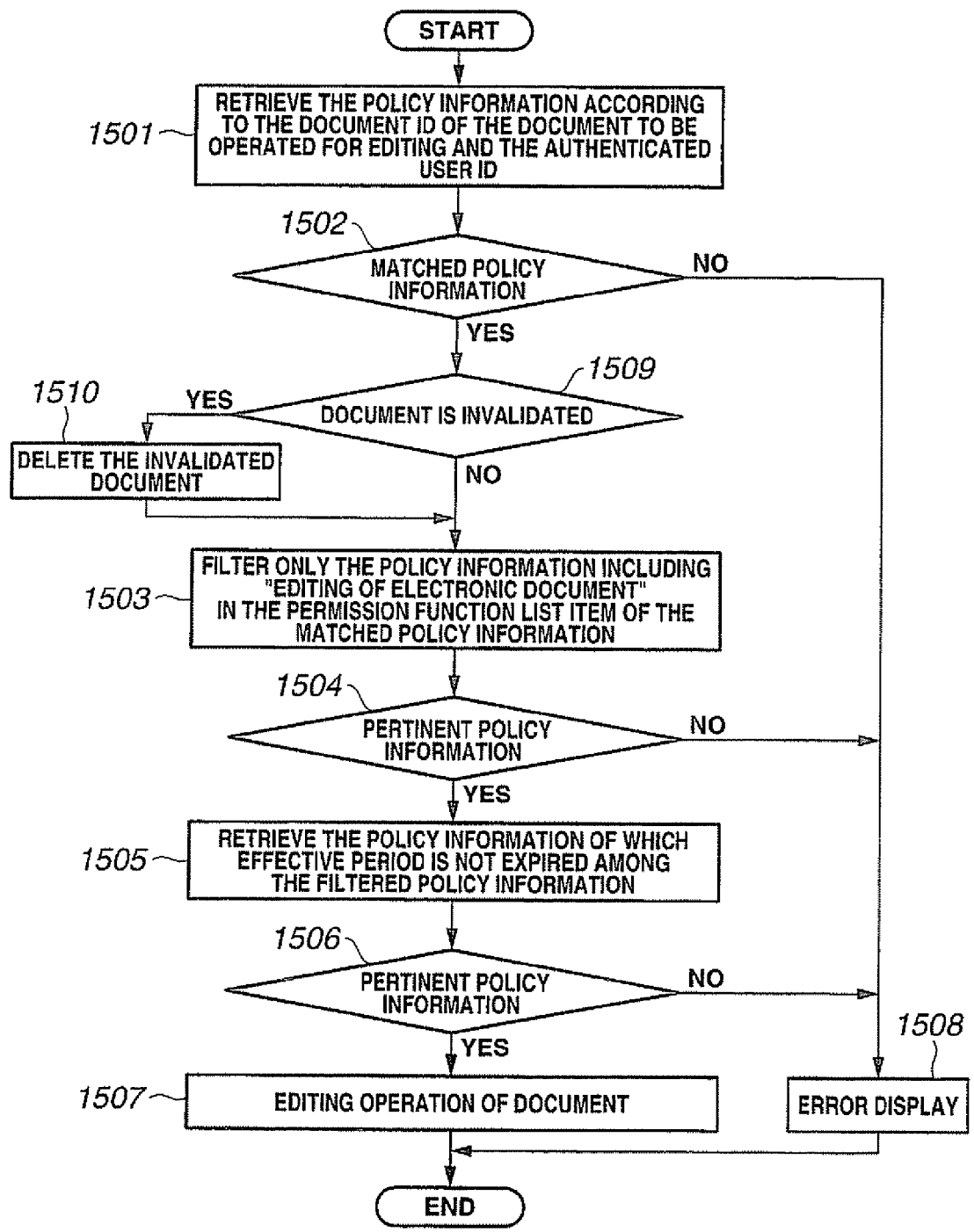
FIG. 15 is a flow chart showing a flow of processing to edit an electronic document by the client PC of the document management system according to the embodiment of the present invention.
Figure 16:
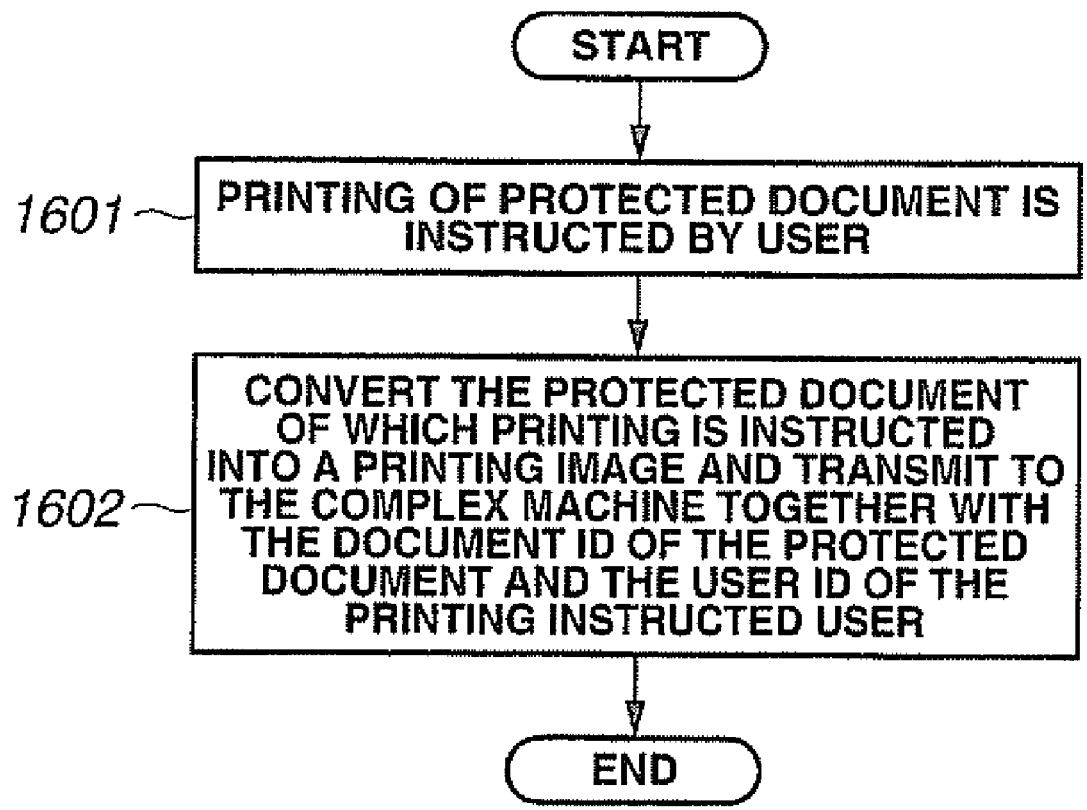
FIG. 16 is a flow chart showing a flow of processing to print an electronic document by the client PC of the document management system according to the embodiment of the present invention.
Figure 17:
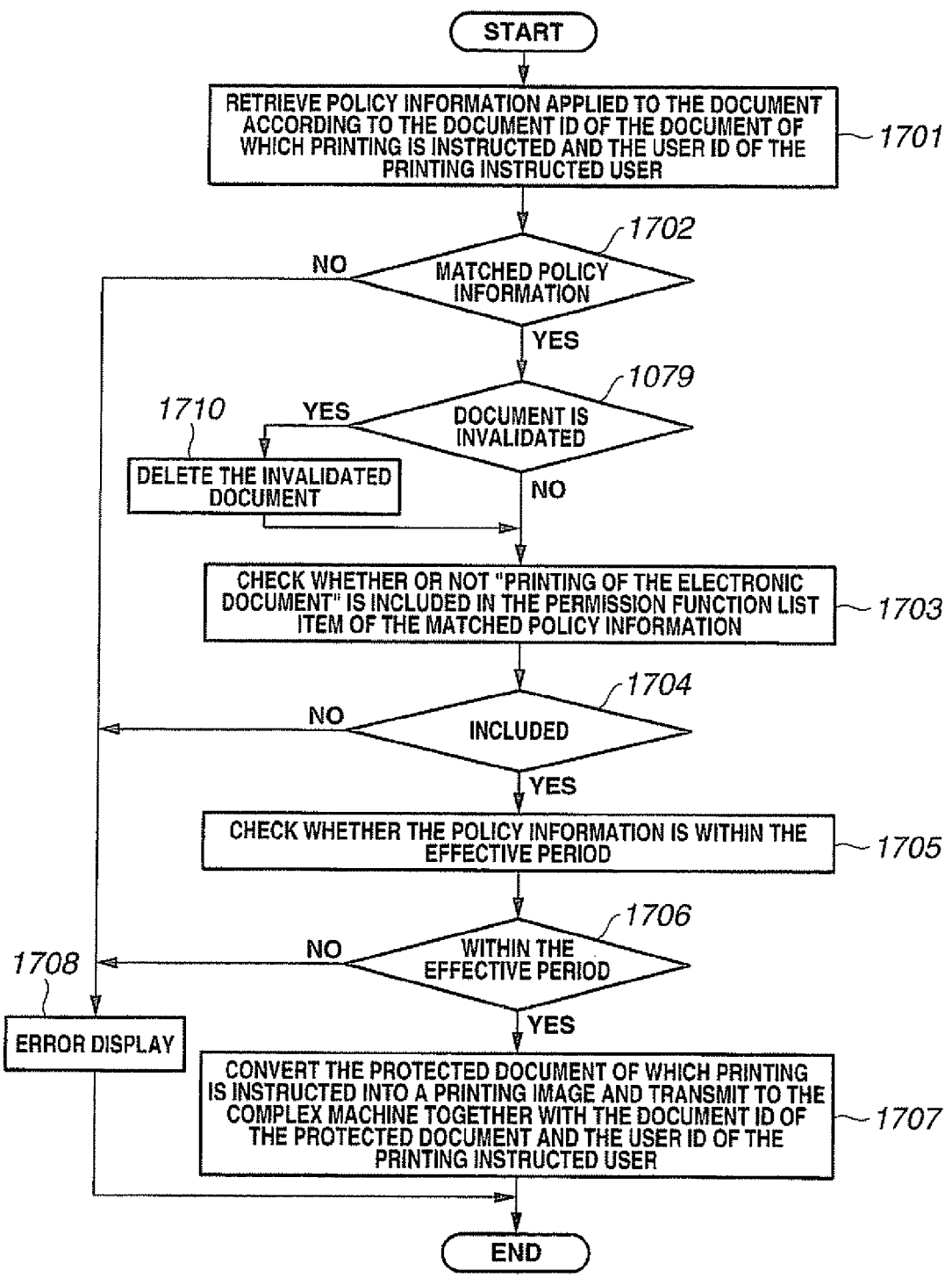
FIG. 17 is a flow chart showing a flow of processing to print an electronic document by the client PC of the document management system according to the embodiment of the present invention.

A detail flow of processing by the document display portion 34 is shown in the flow chart of FIG. 14, a detail flow of processing by the document editing portion 32 is shown in the flow chart of FIG. 15, and a detail flow of processing by the protected document printing portion 39 is shown in the flow charts of FIG. 16 and FIG. 17.

Besides, when the user instructs the invalidation of the document, the control portion 35 authenticates the user by the user authentication portion 37 and instructs the invalidation of the document to the protected document destroying portion 38 together with the user information on the authenticated user.

The document range (invalidation range) to be invalidated by the user can be performed by using the screen shown in FIG. 25. The document range to be invalidated is information indicating a document to be invalidated similarly in association with the invalidation of a certain document. For the retrieval of the related document, the document information managed by the policy server 100 is used.

FIG. 25 shows an example of the screen for designation of the document range to be invalidated.

FIG. 25 is comprised of a document relational structure item 2501 which shows as a tree structure the interrelationship between documents managing document information by the policy server 100 and an invalidation range item 2502 which designates a document to be invalidated, and the invalidation range is designated by depressing an OK button 2509, and the processing is cancelled by depressing a cancel button 2510.

The document relational structure item 2501 in FIG. 25 shows relationships of ten documents, showing that "document 1" is determined as a root document, and "document 2", "document 3" and "document 4" are generated from the root document. It also shows that "document 5" and "document 6" are derived from "document 2", "document 7" and "document 8" are derived from "document 3", and "document 9" and "document 10" are derived from "document 4".

In the above relationships, a condition to designate a document falling in the invalidation range is selected by the invalidation range item 2502. The invalidation range item 2502 shows six conditions for selection of the document to be invalidated.

A first condition is shown as "This document only", and only the document which is designated as the document to be invalidated is determined as ma invalidation range, and a second condition is shown as "All derived documents", and all related documents related to the document designated as the document to be invalidated are determined as invalidation range.

A third condition is shown as "Document derived from this document as starting point", and the document derived from the document designated as the document to be invalidated is determined as invalidation range, and a fourth condition is shown as "Other than the document derived from this document as starting point", and a document other than the documents derived from the document designated as the document to be invalidated is determined as invalidation range.

A fifth condition is shown as "Document derived from sibling relationship", and the document derived from the document which is in a sibling relationship with the document designated as the document to be invalidated is determined as invalidation range. A sixth condition is shovel as "Other than documents derived from sibling relationship", and the document derived from the documents other than the document which is in a sibling relationship with the document designated as the document to be invalidated is determined as invalidation range.

Incidentally, the sibling relationship means a document which has the same nearest derivation source document. For example, documents which are in a sibling relationship with "document 3" are "document 2" and "document 4" which have the nearest "document 1" as the derivation source.

FIG. 25 shows an example that the third condition "Document derived from this document as starting point" is selected, and under this condition, since the document which is the starting point is "document 3", "document 7" and "document 8" become documents designated as invalidation range. In other words, "document 3" is designated as the document to be invalidated, and "document 7" and "document 8" are also designated as the documents to be invalidated.

When the first condition is designated, "this" is set as the value of the tag element <Range> indicated in the XML invalidation request, when the second condition is designated, "all" is set as the value of the tag element <Range> indicated in the XML invalidation request, when the third condition is designated, "Condition_1" is set as the value of the tag element <Range> indicated in the XML invalidation request, when the fourth condition is designated, "Condition 2" is set as the value of the tag element <Range> indicated in the XML invalidation request, when the fifth condition is designated.

"Condition_3" is set as the value of the tag element <Range> indicated in the XML invalidation request, and when the sixth condition is designated. "Condition 4" is set as the value of the tag element <Range> indicated in the XML invalidation request.

Thus, when the invalidation range is designated with reference to FIG. 25, the protected document destroying portion 38 transmits to the policy server 100 an invalidation processing request for the document designated in the invalidation range. When the document is invalidated by the policy server 100, the protected document destroying portion 38 responds to the control portion 35 that invalidation is set in the policy information of the document which is designated to the invalidation range.

Thus, the control portion 35 requests the document deletion portion 36 for deletion of the document undergone the invalidation of the policy information, and the document deletion portion 36 deletes the designated document.

Figure 5:
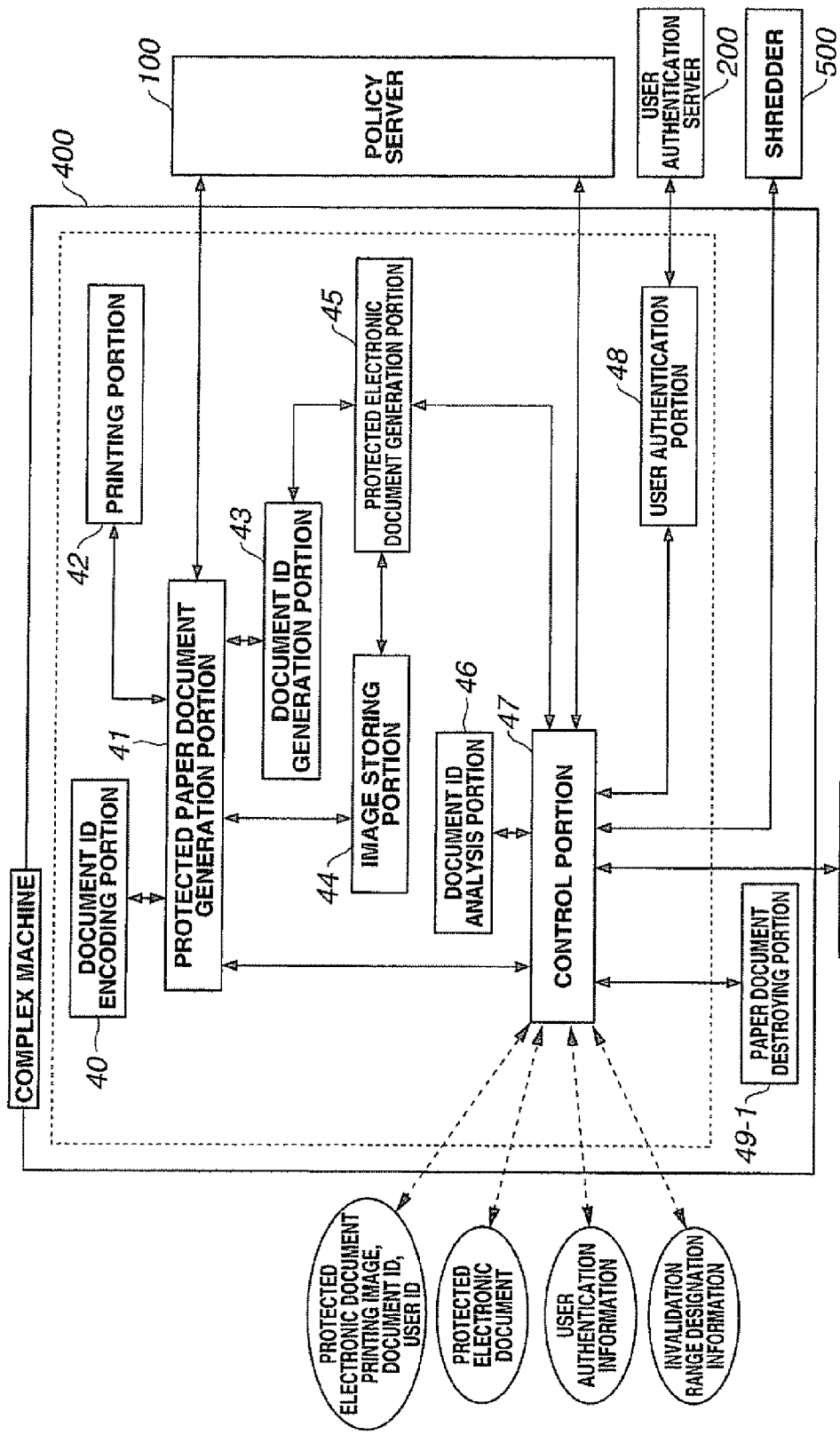
FIG. 5 is a block diagram showing a detail structure of the complex machine shove in FIG. 1.
Figure 6:
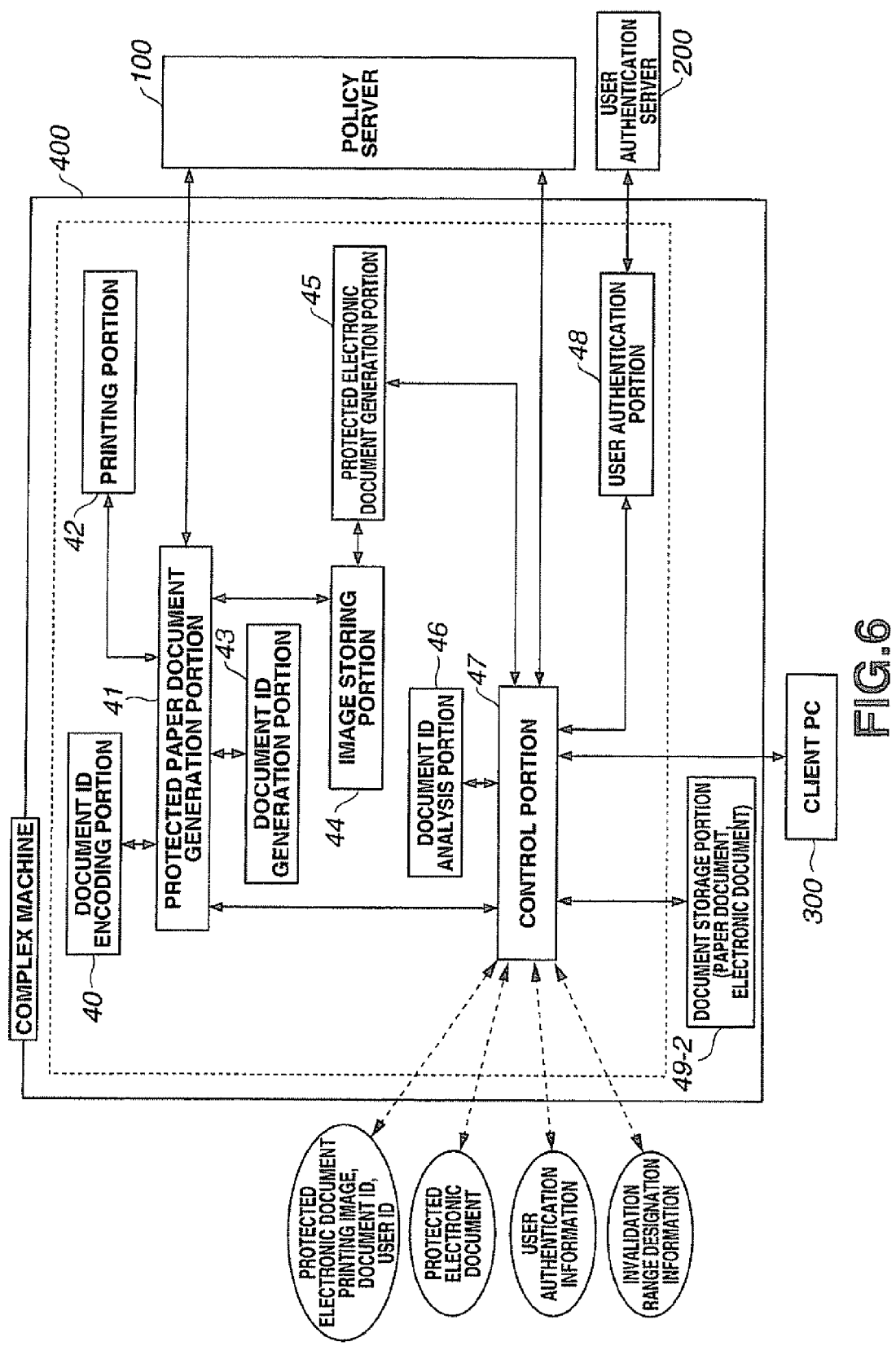
FIG. 6 is a block diagram showing a detail structure of the complex machine shown in FIG. 1.

FIG. 5 and FIG. 6 are block diagrams showing detail structures of the complex machine shown in FIG. 1.

First, the complex machine of FIG. 5 shows a structure that disposal processing is performed by shredding the document when it is instructed to perform duplicating (copying), scanning, facsimile transmission or the like of the paper document invalidated by the invalidation processing.

The complex machine 400 shown in FIG. 5 is comprised of a document ID encoding portion 40, a protected paper document generation portion 41, a printing portion 42, a document ID generation portion 43, an image storing portion 44, a protected electronic document generation portion 45, a document ID analysis portion 46, a control portion 47, a user authentication portion 48 and a paper document destroying portion 49-1.

The control portion 47 is main control of the complex machine 400 and controls for printing, duplicating (copying), scanning, facsimile transmission, invalidation and the like of the protected document.

When it is instructed to perform processing to duplicate or scan the protected paper document, the control portion 47 makes the authentication request to the user authentication portion 48 for the user having made the instruction. The user authentication portion 48 performs processing to authenticate the user by communicating with the authentication server 200. For example, the user is authenticated by a combination of the user ID and the password input by the user through the user interface.

When the authentication is success, the control portion 47 sends the requested document to the document ID analysis portion 46 for analysis of the document ID. It is checked whether or not the requested processing is permitted by inquiring of the policy server 100 about the policy information on the document ID according to the analyzed document ID and the authenticated user information. If the operation requested by the policy information is permitted, the processing is continued.

At the time of duplicating instruction, the control portion 47 transmits a generation request of a protected paper document including a document to the protected paper document generation portion 41. The protected paper document generation portion 41 generates an image which becomes a source of the protected paper document which has the document ID generated by the document ID generation portion 43 and encoded (coding) into a two-dimensional bar code or the like by the document ID encoding portion 40 embodied into the image of the document read by the scan function.

At this time, if the document which has become a source for generation of the protected paper document is a paper document, in other words, when the paper document is read by the scanning function in order to generate the protected paper document, it may be configured to store the paper document into a special tray without discharging the paper document. Thus, the user uses the generated protected paper document in the following processing.

It is particularly effective when the scanning function is realized by an ADF (Auto Document Feeder).

When an image is generated, the protected paper document generation portion 41 stores it in the image storing portion 44 and also outputs a paper document for the image from the printing portion 42. It is a "protected paper documents".

And, the control portion 47 performs processing to register information on the generated document ID into the policy server.

In the above description, when scanning is instructed, the right is checked for the policy server, and the control portion 47 transmits the document together with the authenticated user information to the protected electronic document generation portion 45. The protected electronic document generation portion 45 generates a protected electronic document for the protected paper document, but it is an image generated by reading the paper document by the scanning function of the complex machine 400, and the encrypted image is set with a document ID which is generated by the document ID generation portion 43. Thus, the protected electronic document is generated, and the generated document ID is registered into the policy server.

In a case where a printing request is made from the client PC 300, information on the printing image, document ID and user ID of the document is designated, and a printing instruction is given to the control portion 47. At this time, the given user ID and document ID are designated the right is inquired of the policy server 100 to check whether or not the printing right has been permitted.

If permitted, the control portion 47 designates a printing image and transmits a protected paper document generation request to the protected paper document generation portion 41. The protected paper document generation portion 41 generates an image which becomes a source for the protected paper document which has the document ID generated by the document ID generation portion 43 and encoded (coding) into a two-dimensional bar code or the like by the document ID encoding portion 40 embodied into the printing image.

And, the control portion 47 performs processing to register information on the generated document ID into the policy server.

In the above processing, if the document invalidation is designated by the policy information on the paper document to be processed, the document is transferred to the paper document destroying portion 49-1 or the shredder 500 in order to destroy the document requested to be processed.

The paper document destroying portion 49-1 performs processing to destroy by shredding the paper document whose document ID has been read.

The complex machine 400 is also provided with a function to invalidate the protected paper document. When the invalidation is instructed, the control portion 47 performs the authentication request of the user having made the instruction to the user authentication portion 48. The user authentication portion 48 performs processing to authenticate the user by communication with the authentication server 200. For example, the user is authenticated by a combination of the user ID and the password input by the user through the user interface.

If the authentication is success, the control portion 47 transmits the requested document to the document ID analysis portion 46 to analyze the document ID. The analyzed document ID, the authenticated user, the document ID and the invalidation range designated by the user are designated, and the invalidation of the document is instructed to the policy server 100. Then, the object paper document is sent to and destroyed by the paper document destroying portion 49-1.

Then, when processing to perform duplicating (copying), scanning, facsimile transmission or the like of the invalidated electronic document or paper document is instructed, the complex machine of FIG. 6 performs processing to store the document into a special tray or storage area.

The complex machine shown in FIG. 6 is similar to the structure of the complex machine shown in FIG. 5, so that differences are mainly described below.

The complex machine shown in FIG. 6 is comprised of a document ID encoding portion 40, a protected paper document generation portion 41, a printing portion 42, a document ID generation portion 43, an image storing portion 44, a protected electronic document generation portion 45, a document ID analysis portion 46, a control portion 47, a user authentication portion 48 and a document storage portion 49-2.

The complex machine structured as shown in FIG. 5 transfers the invalidated document to the paper document destroying portion 49-1, but the complex machine structured as shown in FIG. 6 stores the invalidated document into the document storage portion 49-2.

The document storage portion 49-2 is realized by a storage tray and a storage area and, when the paper document is invalidated by the processing on the paper document and the paper document is undergone the invalidation processing a, stores the object paper document into the storage tray.

The storage tray is a special tray which is locked and can be accessed by only a manager having a key.

Figure 7:
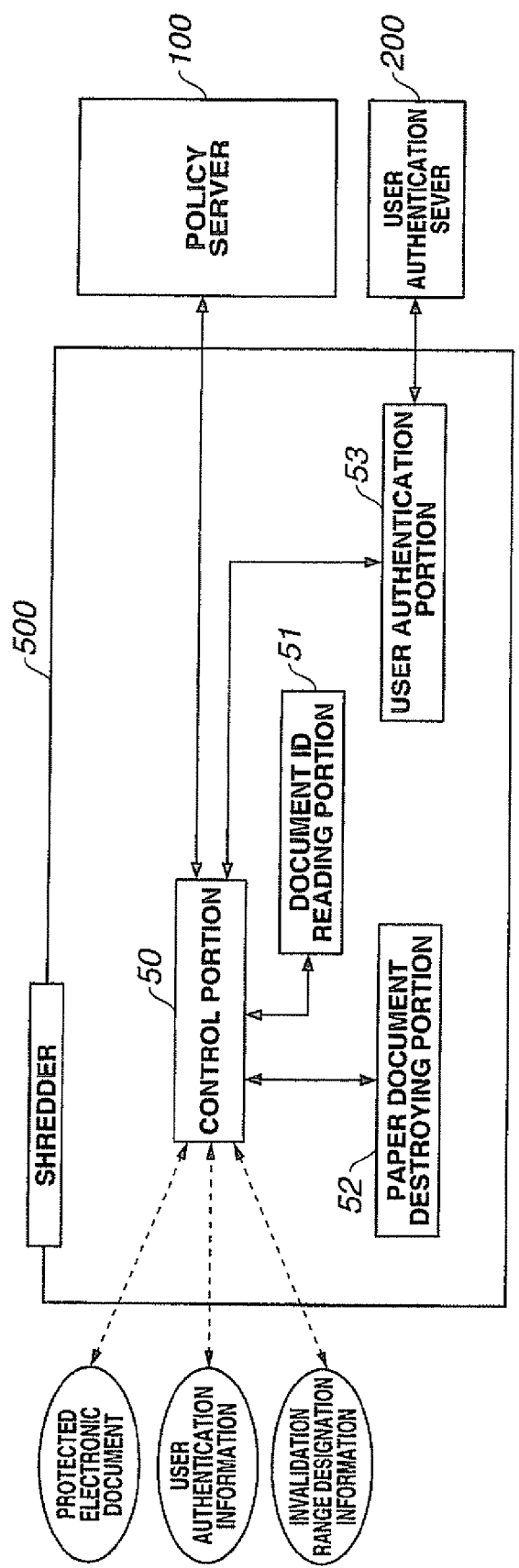
FIG. 7 is a block diagram showing a detail structure of the shredder shown in FIG. 1.

FIG. 7 is a block diagram showing a detail structure of the shredder shown in FIG. 1.

The shredder 500 shown in FIG. 7 is comprised of a control portion 50, a document ID reading portion 51, a paper document destroying portion 52 and a user authentication portion 53 and can make data communication with other nodes on the network. For example, when a paper document to be destroyed is set at the insertion opening, its document ID is read and transmitted to the policy server 100.

First, when the paper document is set at the insertion opening, the control portion 50 makes an authentication request to the user authentication portion 53 in order to authenticate the user who destroys the paper document. The user causes to read user information from an IC card or inputs the user ID and password through the user interface, and the user authentication portion 53 performs user authentication by communication with the user authentication server 200.

When the user is authenticated by the user authentication portion 53, user information on the authenticated user is responded to the control portion 50. The control portion 50 judges that the authentication has been made when the user information is responded and gives a reading instruction to the document ID reading portion 51 to read the document ID of the paper document.

The document ID reading portion 51 is comprised of a reading mechanism such as a CCD (Charge Coupled Devices) and decodes the read document ID. When the reading of the document ID is success and the decoding is made, the document reading portion 51 responds that effect to the control portion 50. Thus, the control portion 50 instructs the paper document destroying portion 52 to destroy the paper document set at the insertion opening.

The paper document destroying portion 5) destroys the paper document by shredding.

Besides, the control portion 50 transfers the read document ID and the designated invalidation range information to the policy server 100 to set the invalidation in the policy information on the pertinent document. In other words, the present date and time are set in the [invalidated date and time] item 908 of the document information table shown in FIG. 9.

Incidentally, as a method of designating the invalidation range, there is, for example, a method of selecting the invalidation range by buttons provided on the shredder 500. In this case, a [all derived documents] button and a [this document only] button are provided, and when the [all derived documents] button is depressed, all documents related to the read document ID are designated as documents to be invalidated. And, when the [this document only] button is depressed, it is designated that only the document of the read document ID is invalidated.

In a case where the document invalidated by the policy information is duplicated by the complex machine 400, the document is destroyed by the complex machine 400. The paper document is stored in a special storage tray or deleted by a co-disposed shredder (different from the shredder 500).

Thus, the processing to destroy the invalidated paper document is performed.

Detail flows of various processing described above are described below with reference to the flow charts of FIG. 10 to FIG. 24.

Figure 10:
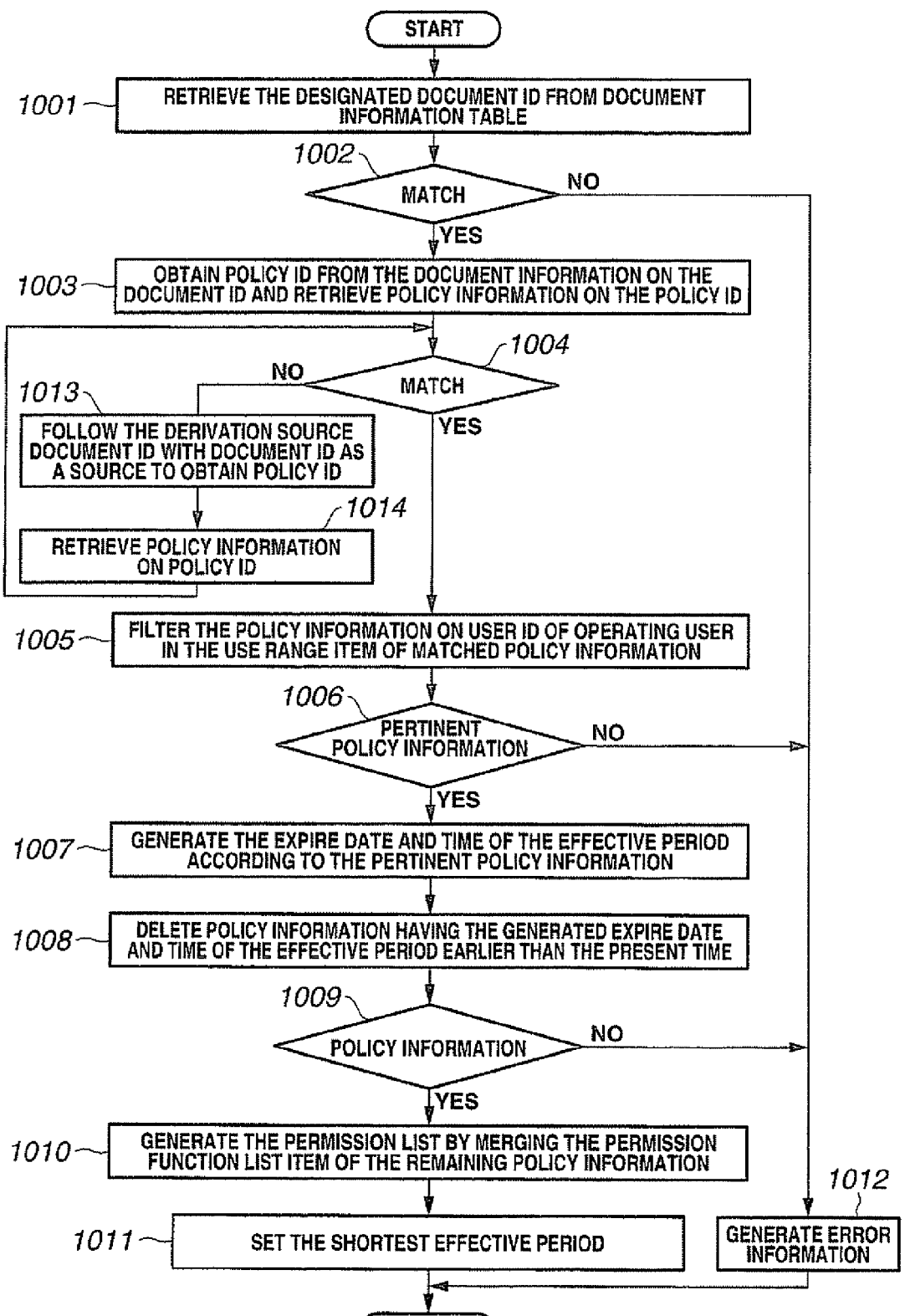
FIG. 10 is a flow chart showing a flow of processing to retrieve the policy information by the policy server of the document management system according to the embodiment of the present invention.

FIG. 10 is a flow chart showing a flow of processing to retrieve policy information performed by the policy server of the document management system according to an embodiment of the present invention.

In FIG. 10 when operation information permitted by the policy information with the document ID and the user ID designated is requested from the external device such as the client PC or the complex machine, the processing is started, and based on the document ID, the document information on the document indicated by the document ID is retrieved (1001). It is judged whether or not the document information has been retrieved (1002), and if the document information cannot be retrieved (NO in 1002), error information is generated and a response is made to the external device of the requesting source (1012).

If the document information can be retrieved (YES in 1002), the policy ID indicated by the document information is obtained, and the policy information indicated by the policy ID is retrieved (1003).

If the policy ID is not designated, the derivation source document ID of the document information is referred to, the document information on the derivation source document ID is retrieved, and the designated policy ID is used. If it is not designated, the processing is performed to follow the derivation source.

In other words, the policy ID should have been designated for the root document.

It is judged whether or not the policy information on the policy ID could be retrieved (1004) and, if not retrieved (NO in 1004), the derivation source document ID of the document information is referred to, the document information on the derivation source document ID is retrieved, and the policy ID designated therein is used. Processing to obtain the policy ID is performed by sequentially following to the derivation source (root) (1013). The policy ID is designated for at least the root document.

Subsequently, the policy information on the policy ID is retrieved (1014). Then, the procedure returns to step 1004 where it is judged again whether or not the policy information matches. Thus, the processing is performed repeatedly.

If the policy information on the policy ID could be retrieved (YES in 1004), only the policy information that the user ID is shown in the usage range item of the policy information is filtered (1005). As a filtered result, it is judged whether or not there is policy information that the user ID is shown (1006), and if there is no pertinent policy information (NO in 1006), error information is generated, and a response is made to the external device of the requesting source (1012).

If there is pertinent policy information (YES in 1006), the expire date and time of the period is generated with the policy information determined valid from the information on the effective period of the filtered policy information and the document generation date and time (1007). If the expire date and time of the generated effective period is earlier than the present time, the policy information cannot be applied. Therefore, the policy information is deleted (1008).

It is judged whether or not there is remaining policy information (1009) and, if there is no pertinent policy information remained (NO in 1009), error information is generated to respond to the external device of the requesting source (1012).

If there is policy information remained (YES in 1009), the permission function list item of the policy information is merged to generate an operation list of permitted operations (1010). And, among the expiration dates of the remained policy information, the shortest one is set as the expiration date of the operation shown in the generated operation list (1011). And, if the invalidated date and time is designated as the document information, the invalidated date and time is given to the permit list.

Figure 11:
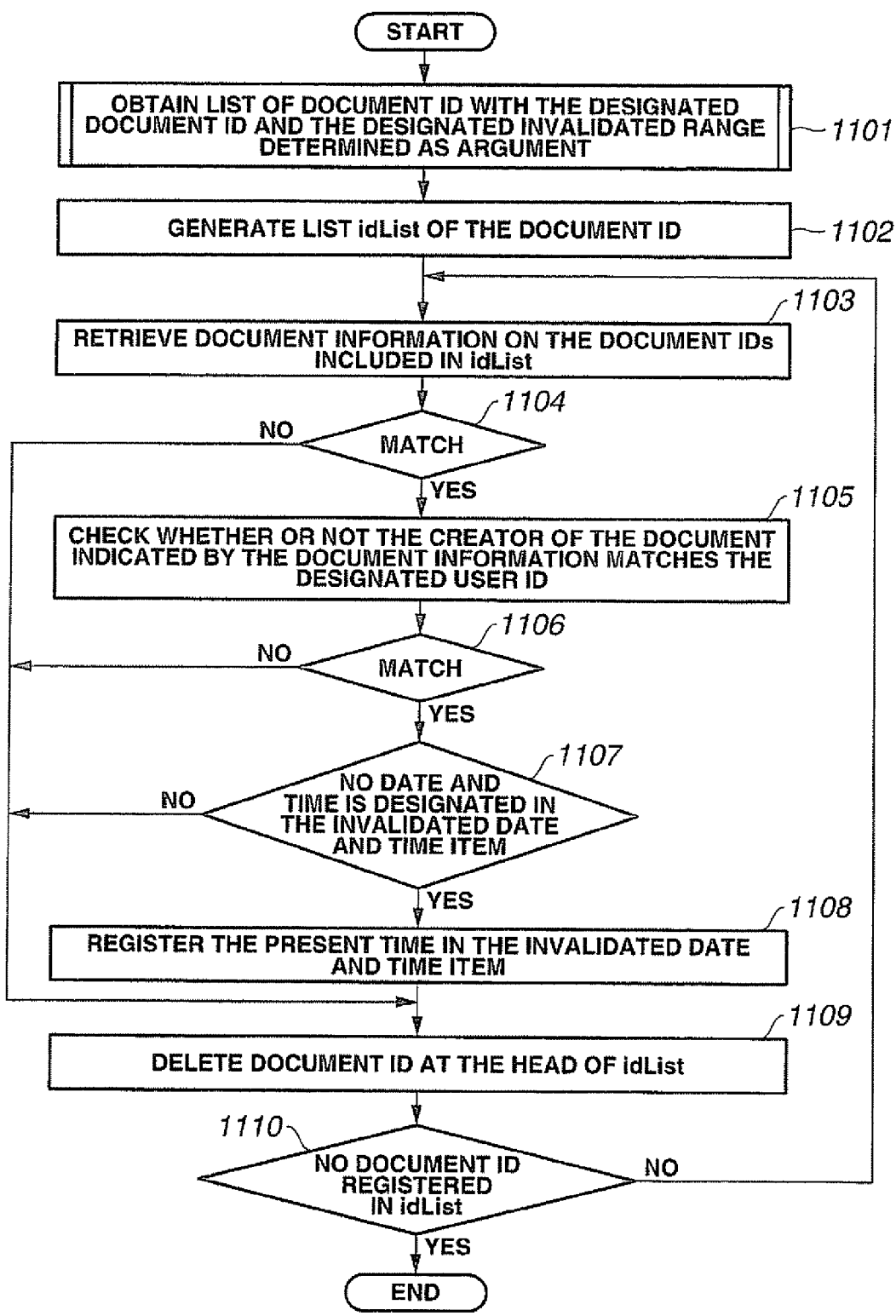
FIG. 11 is a flow chart showing a flow of processing to invalidate a document by the policy server of the document management system according to the embodiment of the present invention.

FIG. 11 is a flow chart showing a flow of processing to invalidate a document performed by the policy server of the document management system according to an embodiment of the present invention.

In FIG. 11 when the invalidation request with information such as the document ID, user ID and invalidation range designated is received from the external device such as the client PC or the complex machine, the processing is started, and the document ID of the document included in the information on the invalidated range is obtained from the document information managed by retrieving (1101).

A list "idList" of the obtained document ID is generated (1102), and the following processing is performed on the individual document IDs included in the "idList" (1103 to 1108).

First, the document information on the document IDs shown in the "idList" is retrieved (1103), and it is judged whether or not the document information could be retrieved (1104). If the document information cannot be retrieved (NO in 1104), the document ID is deleted from the "idList" (1109), and the processing is shifted to the next document ID (1110).

If the document information could be retrieved (YES in 1104), it is checked whether or not the creator of the document indicated by the document information matches the designated user ID (1105). It is judged whether or not they match (1106), and if not matched (NC in 1106), the document ID is deleted from the "idList" (1109), and the processing is shifted to the next document ID (1110).

If the user ID of the creator of the document matches the designated user ID (YES in 1106), it is judged whether or not the document indicated by the document information is invalidated (1107). In other words, it is judged whether or not a date and time is designated in the invalidated date and time item of the document information (1107).

If the date and time is designated and invalidated (NO in 1107), the document ID is deleted from the "idList" (1109), and the processing is shifted to the next document ID (1110). If not invalidated (YES in 1107), the present time is registered in the invalidated date and time item in order to invalidate it (1108).

Thus, the policy server invalidates the document.

Figure 12:
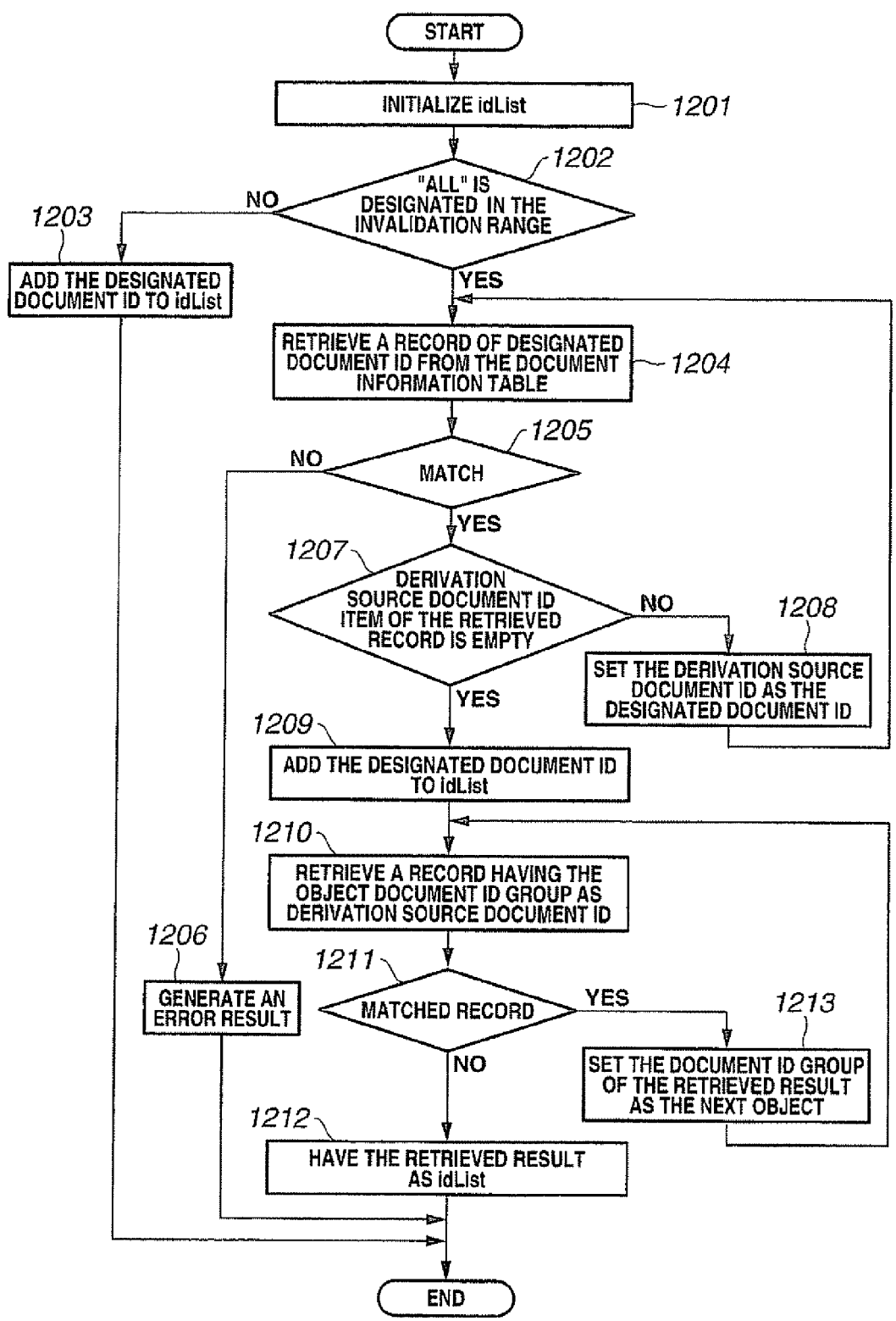
FIG. 12 is a flow chart showing a flow of processing to retrieve a document which is designated to the invalidation range in FIG. 11.

FIG. 12 is a flow chart showing a flow of processing to retrieve the document designated to the invalidation range of FIG. 11.

In FIG. 12, to retrieve the document designated to the invalidation range, the "idList" showing the designated document is initialized (1201). And, it is judged whether or not the range designated as the invalidation range is "all" (1202). If the "all" is not designated (NO in 1202), for example, if the invalidation range is "this", the "idList" which is designated to the document for invalidating the document ID included in the invalidation request received from the external device is generated (1203).

In a case where "all" is designated to the invalidation range (YES in 1202), document information on the document indicated by the document ID is retrieved (1204). As a retrieved result, it is judged whether or not the document information could be retrieved (1205). If the document information on the document ID cannot be retrieved (NO in 1205), a result indicating an error is generated (1206).

Meanwhile, if the document ID could be retrieved (YES in 1205), it is judged whether the derivation source document item of the retrieved document information is not registered and the document indicated by the document ID is the root document (1207). If it is not a root document (NO in 1207), the document ID of the derivation source document designated to the derivation source document item is set to the document ID of the document designated for retrieval of the invalidation range (1208). Based on the document ID, processing from step 1204 to step 1207 is performed repeatedly.

If the document ID is not registered in the derivation source document ID item (YES in 1207), it can be judged that the document ID is root document. When the root document is retrieved, the root document is added as the document designated to the invalidation range into the "idList" (1209). After that, the document ID is determined as the root document, and processing is performed to retrieve the document derived from it.

First, document information having the object document ID group as a derivation source document ID is retrieved (1210). Andy it is judged whether or not there is matched document information (1211) and, if there is a matched record (YES in 1211), the retrieved document ID group is determined as the next object (1213), and the individual document IDs are subjected to the processing of step 1210.

When the document information having the object document ID group as the derivation source document ID becomes lost (NO in 1211), the "idList" at that point becomes a list of document ID of the derived document (1212).

Thus, the list of document ID of the document designated to the invalidation range is generated.

Figure 13:
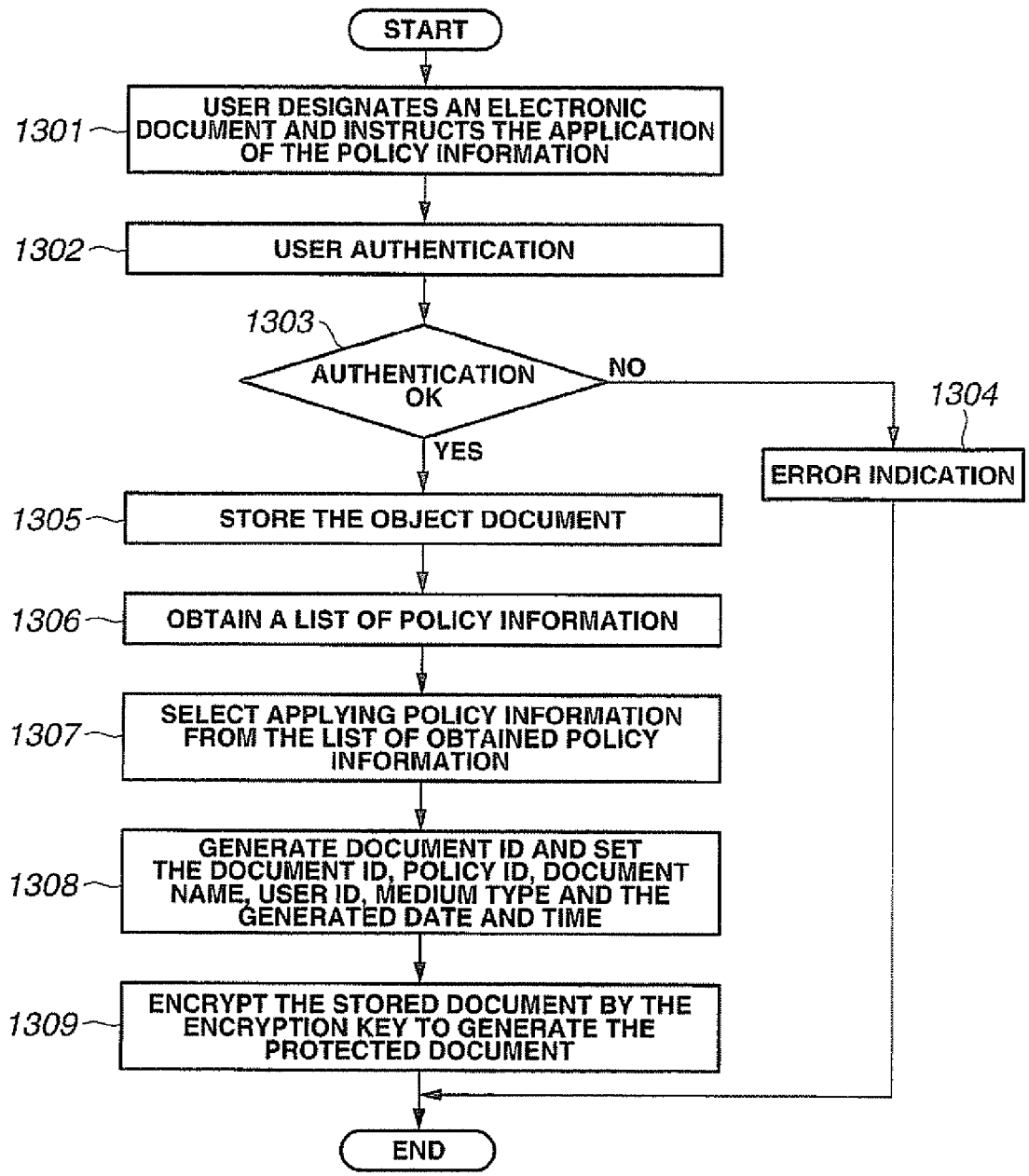
FIG. 13 is a flow chart showing a flow of processing to create a protected electronic document with respect to an electronic document by the document management system according to the embodiment of the present invention.

FIG. 13 is a flow chart showing a flow of processing to generate the protected electronic document with respect to the electronic document by the document management system according to an embodiment of the present invention.

In FIG. 13, the processing to generate the protected electronic document is performed by the client PC, and this function may also be performed by the complex machine. The user designates an electronic document and instructs the application of the policy information (1301). Subsequently, the processing is performed to authenticate the instructed user (1302).

It is judged whether or not authentication could be made (1303), and if not authenticated (NO in 1303), it is shown as an error and the processing is terminated (1304). And, if the user is authenticated (YES in 1303), the object electronic document is stored (1305).

A list is obtained by making a request to obtain a list of policy information applied to the electronic document from the policy server (1306), and the user or the system selects automatically optimum policy information from the policy information shown in the obtained list of policy information (1307).

A document ID for identifying the generated protected electronic document is generated, and the document ID, the policy ID of the selected policy information, the document name, the user ID, the medium type and the generated date and time are designated to register the document information (1308).

The document is encrypted by the encryption key indicated by the selected policy information to generate the protected document (1309).

Thus, the protected electronic document is generated.

FIG. 14 is a flow char-t showing a flow of processing to browse the protected electronic document by the client PC of the document management system according to an embodiment of the present invention.

In FIG. 14, for example, the protected electronic document is generated by the processing shown in FIG. 13, a browsing request is made by the user for the protected electronic document, and the processing is started. Authentication processing of the user having made the browsing request is performed (1401). It is judged whether or not the authentication by the authentication processing was success (1402), and if the authentication was not success (NO in 1402), an error is shown on the screen of the client PC to indicate that the authentication cannot be made (1411).

Meanwhile, if the user authentication is success (YES in 1402), the document ID is read from the protected electronic document to be browsed, policy information is requested to the policy server according to the read document ID and the user ID of the authenticated user (1403).

In response to the request, it is judged whether or not there is a response of the pertinent policy information from the policy server (1404), and if there is no response of the policy information (NO in 1404), it is shown on the screen that there is no pertinent policy information (1411).

If policy information on the document ID and the user ID is responded from the policy server (YES in 1404), it is judged whether or not the object document is invalidated (1412), and if invalidated (YES in 1412), the document is deleted (1413). After the document is deleted, or if not invalidated (NO in 1412), it is checked whether or not the browsing of the electronic document is permitted by the policy information (1405). Specifically, it is checked whether or not "browsing of electronic document" is described in the operation shown in the permission function list item of the responded policy information, and the policy information is filtered.

And, as a filtered result, it is judged whether or not the pertinent policy information is filtered (1406), and if not filtered (NO in 1406), or if the policy information which permits "browsing of electronic document" is not pertinent, it is shown that the operation is rejected (1411).

And, if the policy information which permits the operation has been filtered (YES in 1406), the policy information which is within the effective period is retrieved among the policy information (1407). It is judged by this retrieve whether or not the policy information which is within the expiration date is pertinent (1408), and if there is no pertinent policy information (NO in 1408), that effect is shown (1411).

Meanwhile, if browsing of the electronic document is permitted and there is policy information which is within the effective period (YES in 1408), the protected electronic document is decrypted by the designated decryption key, and the decrypted electronic document is stored together with the document ID (1409). And, the electronic document is shown oil the display screen of the client PC (1410).

Thus, it becomes possible to perform a browsing operation of the electronic document by the client PC.

FIG. 15 is a flow chart showing a flow of processing to edit the electronic document by the client PC of the document management system according to an embodiment of the present invention.

FIG. 15 shows processing to edit the electronic document which is stored by the client PC by the processing shown in FIG. 14, and the processing is started when the user makes a request for editing the electronic document.

At this time, the user is in an authenticated state, and policy information is requested to the policy server according to the document ID of the electronic document to be operated and the user ID of the authenticated user (1501). It is judged whether or not there was a response of the pertinent policy information from the policy server (1502), and if there is no response of matched policy information (NO in 1502), that effect is shown (1508).

When the matched policy information is responded from the policy server (YES in 1502), it is judged whether or not the object document has been invalidated (1509), and if invalidated (YES in 1509), the document is deleted (1510). After the document is deleted or if not invalidated (NO in 1509), it is judged whether or not the editing of the electronic document is permitted by the policy information (1503). Specifically, it is checked whether "editing of electronic document" is designated in the permission function list item of the matched policy information.

When "editing of electronic document" is designated in this item and the editing of the electronic document is permitted (YES in 1502), the policy information that "editing of electronic document" is designated in the permission function list item is filtered, and it is judged whether or not there is the filtered and pertinent policy information (1504).

If there is no filtered policy information (NO in 1504), an error indicating that there is no pertinent policy information is shown (1508). If there is filtered policy information (YES in 1504), policy information which is within the effective period is retrieved among the policy information (1505). It is judged whether or not the policy information within the expiration date is pertinent by this retrieving (1506), and if there is no pertinent policy information (NO in 1506), that effect is shown (1508).

Meanwhile, when the editing of the electronic document is permitted and there is policy information within the effective period (YES in 1506), an editing operation of the electronic document is performed (1507).

Thus, it becomes possible to perform the editing operation of the electronic document by the client PC.

FIG. 16 is a flow chart showing a flow of processing to print an electronic document by the client PC of the document management system according to an embodiment of the present invention.

In FIG. 16, with the electronic document stored by the processing shown in FIG. 14, the authenticated user makes a printing request of the document (1601). A printing image of the electronic document whose printing request was made is generated and transmitted to the complex machine together with the document ID and user ID (1602).

Thus, print processing by the complex machine is started to perform printing. In this case, it is necessary to perform processing to inquire the policy server whether the complex machine has the right.

FIG. 17 is a flow chart showing a second flow of processing to print the electronic document by the client PC of the document management system according to an embodiment of the present invention. In this example, it is checked whether or not the client PC side has the right to perform printing.

FIG. 17 shows processing to print the electronic document stored by the client PC by the processing shown in FIG. 14, and the processing is started when the user makes a request for printing the electronic document.

At this time, the user is in the authenticated state, and policy information is requested to the policy server according to the document ID of the electronic document subjected to the operation and the user ID of the authenticated user (1701). It is judged whether or not there is a response of the pertinent policy information from the policy server (1702), and if there is no matched policy information (NO in 1702), that effect is indicated (1708).

When the matched policy information is responded from the policy server (YES in 1702), it is judged whether or not the object document has been invalidated (1709), and if it is invalidated (YES in 1709), the document is deleted (1710). After the document is deleted, or if not invalidated (NO in 1709), it is checked whether or not printing of the electronic document is permitted by the policy information (1703). Specifically, it is checked whether or not the permission function list item of the matched policy information designates "printing of electronic document".

When this item designates the "printing of electronic document" and the printing of the electronic document is permitted (YES in 1703), filtering of the policy information that "printing of electronic document" is designated in the permission function list item is performed, and it is judged whether or not there is filtered and pertinent policy information (1704).

If there is no filtered policy information (NO in 1704), an error is shown to indicate that there is no pertinent policy information (1708). If there is filtered policy information (YES in 1704), policy information within the effective period is retrieved among the policy information (1705). It is judged by the retrieving whether or not the policy information within the expiration date is pertinent (1706), and if there is no pertinent policy information (NO in 1706), that effect is indicated (1708).

Meanwhile, in a case where printing of the electronic document is permitted and there is policy information within the effective period (YES in 1706), a printing request of the electronic document is performed (1707).

Thus it becomes possible to print the electronic document by the client PC. In this example, since it is checked whether or not the client PC side has the right, it is not essential to check on the complex machine side. Of course, it may be performed by both of them.

Figure 18:
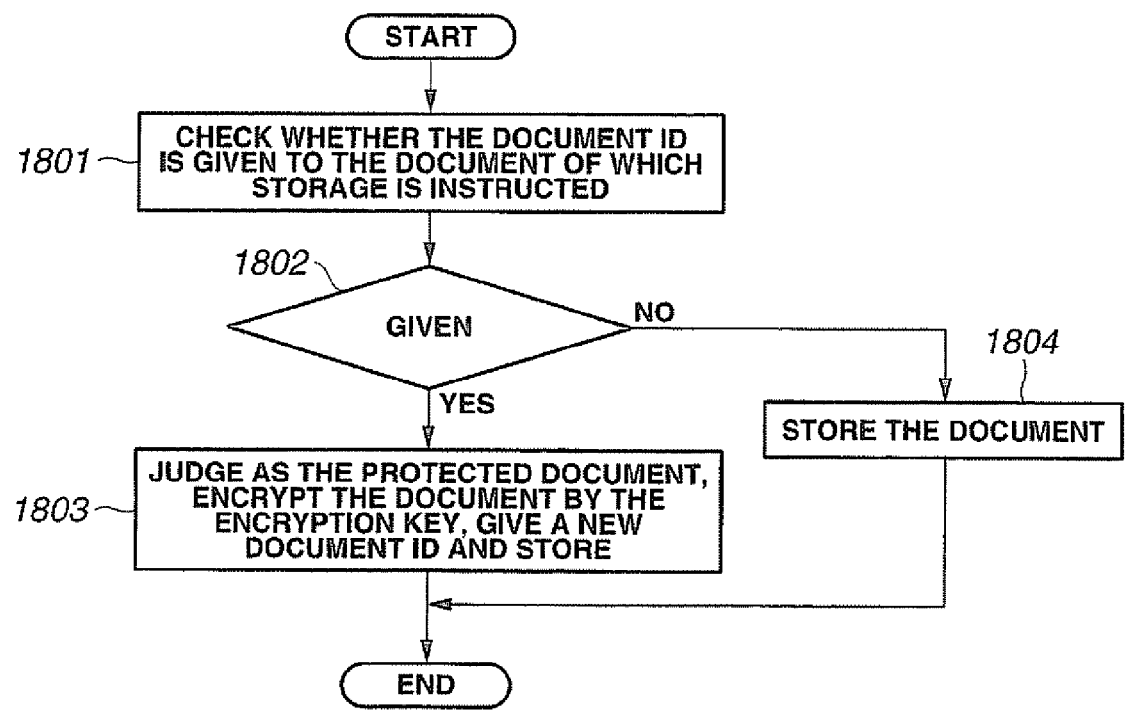
FIG. 18 is a flow chart showing a flow of processing to store an electronic document by the client PC of the document management system according to the embodiment of the present invention.

FIG. 18 is a flow chart showing a flow of processing to store the electronic document by the client PC of the document management system according to an embodiment of the present invention.

In FIG. 18, when storage of the electronic document to be stored by the client PC is instructed by the authenticated user, it is checked whether or not the document ID has been given to the electronic document of which storage is instructed (1801). In other words, if the document ID has been given, it can be judged that it is a document to be protected.

It is judged whether or not the document ID has been given (1802), and if the document ID has been given (YES in 1802), the encryption key is used to encrypt the document, a new document ID is given, and the document is stored (1803). If a document ID has not been given (NO in 1802), the electronic document is stored as it is (1804).

Figure 19:
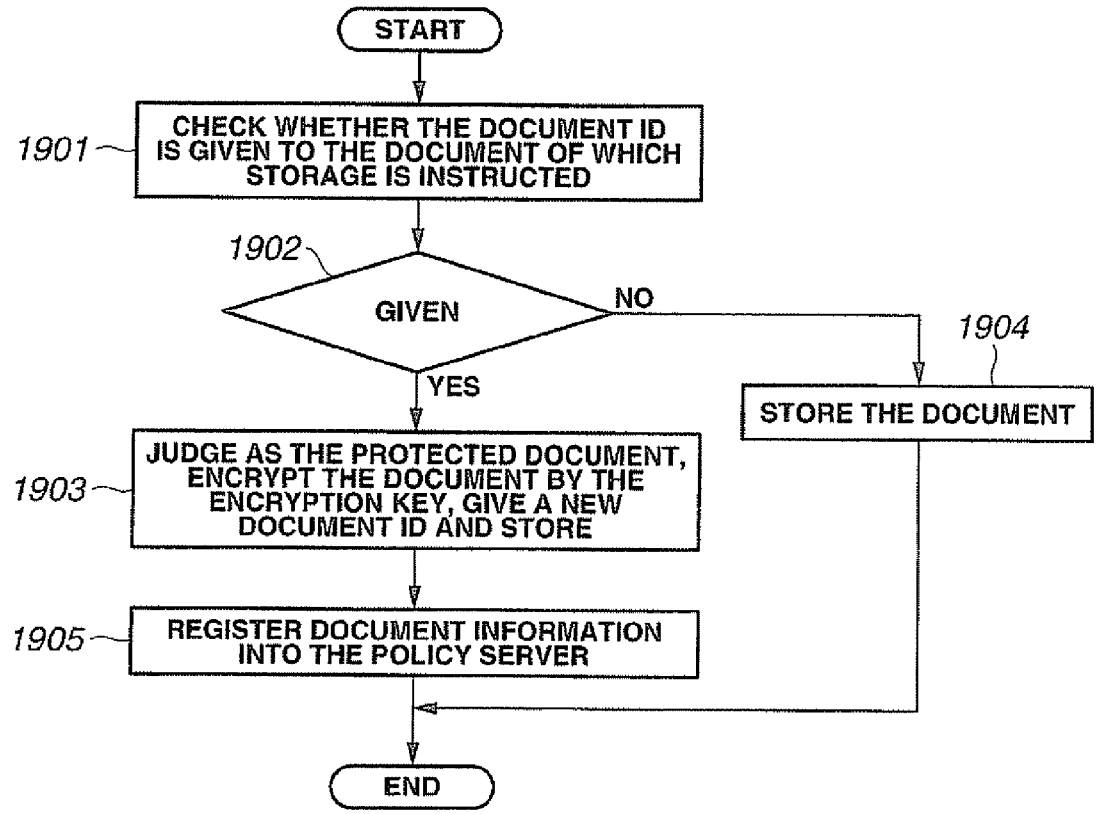
FIG. 19 is a flow chart showing a flow of processing to store an electronic document by the client PC of the document management system according to the embodiment of the present invention.

FIG. 19 is a flow chart showing a flow of a second example of processing to store the electronic document by the client PC of the document management system according to the embodiment of the present invention. In this case, processing to derive at the time of editing and storing is performed. In other words, the stored document is in a derived relationship with the document before storage and handled as a different document.

In FIG. 19, when the storage of the electronic document to be stored by the client PC is instructed by the authenticated user, it is checked whether or not a document ID is given to the electronic document whose storage is instructed (1901). In other words, if the document ID has been given, it can be judged that it is the document to be protected.

It is judged whether or not the document ID has been given (1902), and if the document ID has been given (YES in 1902), the encryption key is used to encrypt the document, and a new document ID is given and the document is stored (1903). If the document ID has not been given (NO in 1902), the electronic document is stored as it is (1904).

And, when the protected electronic document with respect to the document to which the document ID is given is generated, a newly given document ID, an old document ID which has been given to the original document, the document name, the user ID of the user having performed the operation, the medium type, and document information at the generated date and time are registered (1905).

Figure 20:
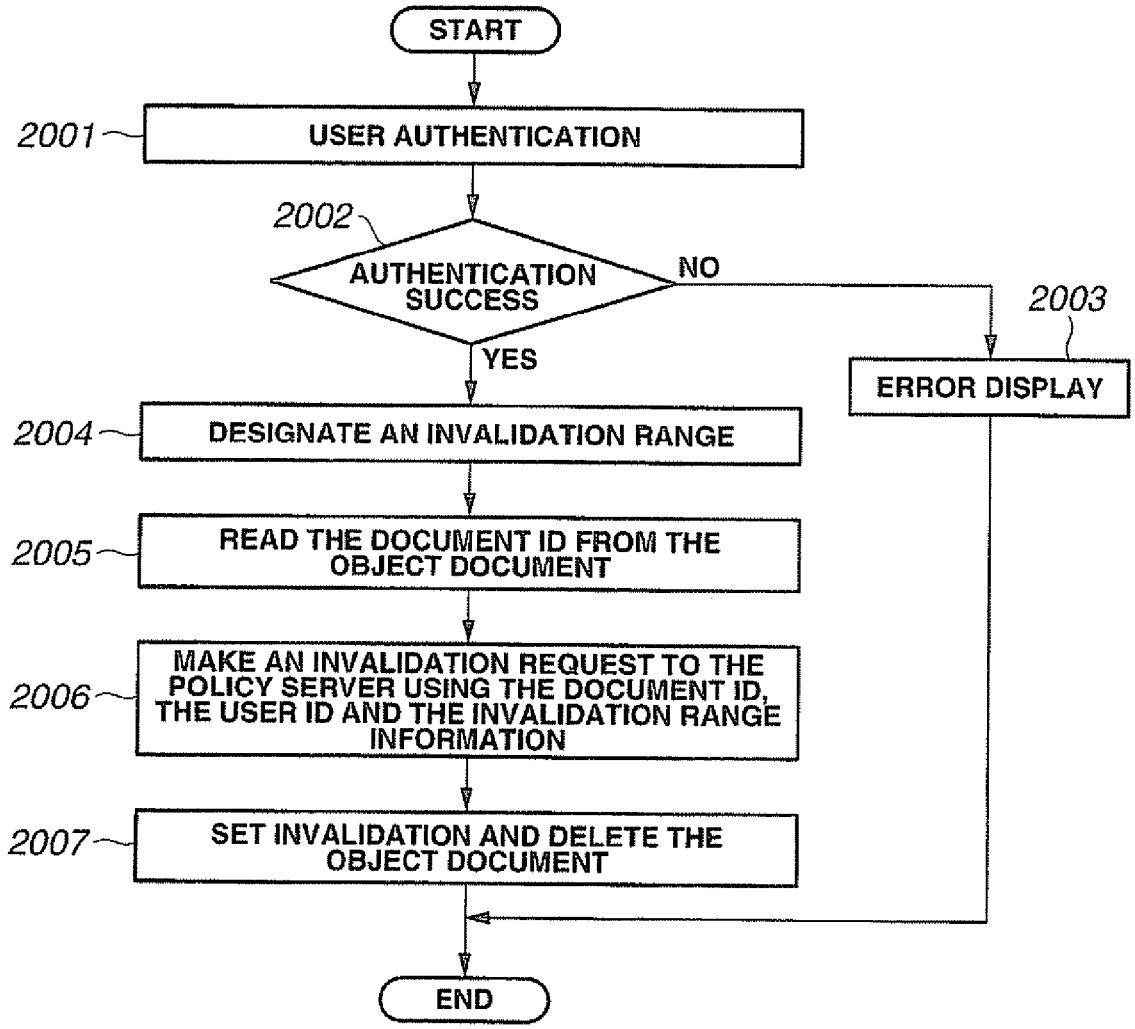
FIG. 20 is a flow chart showing a flow of processing to invalidate performed by the client PC of the document management system according to the embodiment of the present invention.

FIG. 20 is a flow chart showing a flow of invalidation processing performed by the client PC of the document management system according to an embodiment of the present invention.

When the user designates a protected electronic document to be invalidated, user authentication is performed first (2001). It is judged whether or not the authentication has been performed (2002), and if cannot be authenticated (NO in 2002), that effect is shown (2003).

If the authentication is success (YES in 2002), an invalidation range is designated in the protected electronic document (2004). As a method of designating the invalidation range, there are, for example, a method of designating by a user operation by showing a screen to the user and a method that the invalidation range is previously designated.

The invalidation range designated by the designation method is determined to be either only the document designated to the protected electronic document or all the electronic documents related to the protected electronic document.

When the invalidation range is designated, the document ID is read from the object document (2005). According to the read document ID, the user ID of the authenticated user and the designated invalidation range, document invalidation is requested to the policy server (2006). When a response is given from the policy server to the request, invalidation processing is completed according to the response, and the electronic document is deleted (2007).

Figure 21:
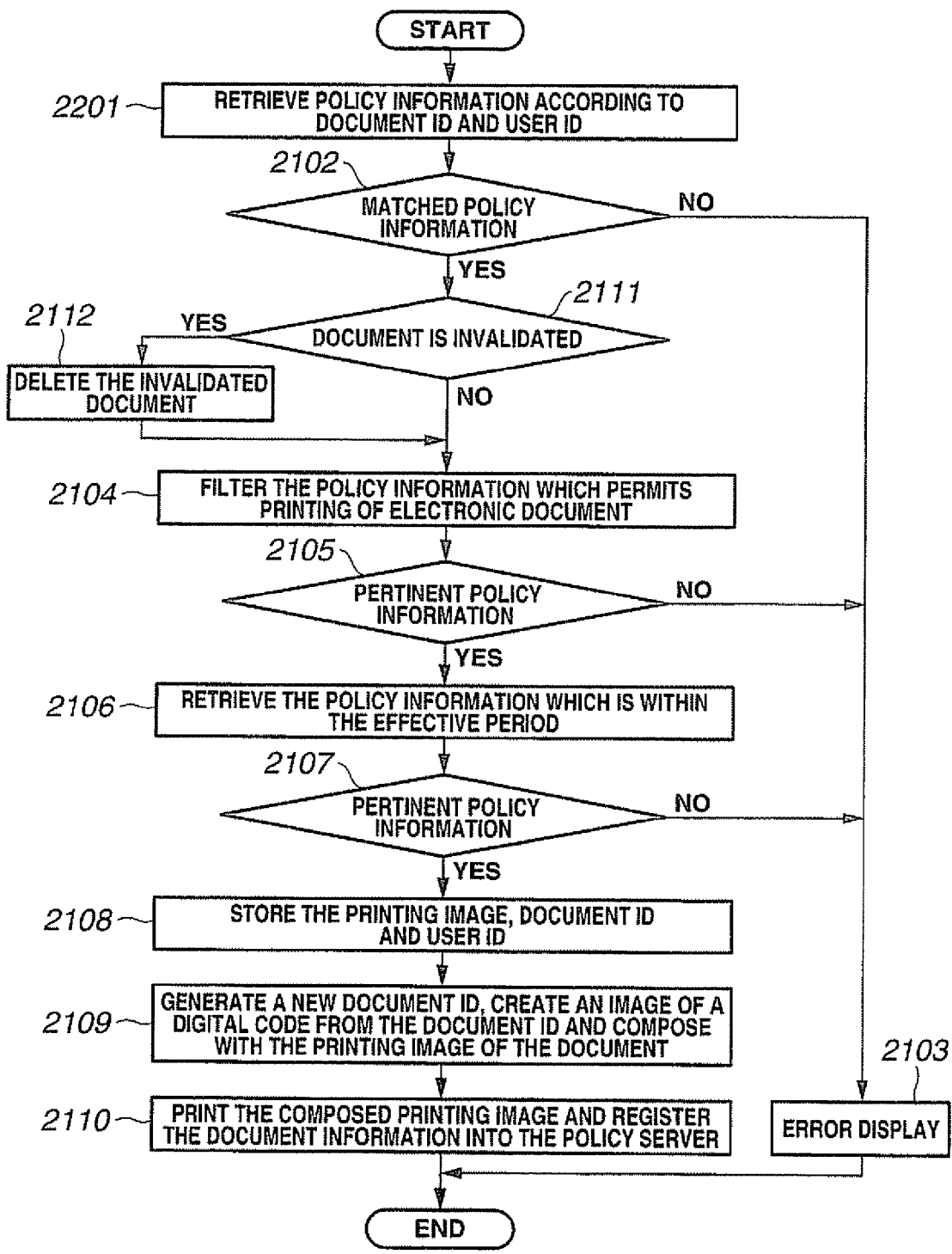
FIG. 21 is a flow chart showing a flow of processing to print performed by the complex machine of the document management system according to the embodiment of the present invention.

FIG. 21 is a flow chart showing a flow of printing processing performed by the complex machine of the document management system according to an embodiment of the present invention.

In FIG. 21 the processing is started when the printing request is received from the client PC, and policy information on the document ID and user ID contained in the printing request is requested to the policy server (2101). It is judged whether or not the policy information could be retrieved by the policy server (2102), and if not retrieved (NO in 2102), that effect is shown (2103).

And, if the policy information could be retrieved (YES in 2102), it is judged whether or not the object document has been invalidated (2111), and if invalidated (YES in 2111), the document is deleted (2112). After the document is deleted, or if not invalidated (NO in 2111), policy information that printing of the electronic document is permitted by the policy information is filtered (2104). Specifically, policy information that "printing of electronic document" is designated in the permission function list item of the policy information is filtered.

As a result, it is judged whether or not there is filtered policy information (2105), and if the policy information does not match (NO in 2105), an error is shown (2104). If the policy information matched (YES in 2105), policy information within the effective period which is set on the matched policy information is retrieved (2106). It is judged whether or not there is policy information which is within the effective period (2107), and if all have exceeded the effective period (NO in 2107), that effect is shown (2103).

If there is policy information which is within the effective period (YES in 2107), the printing image, document ID and user ID whose printing is requested are stored (2108). And, a document ID is newly generated, and an image of a digital code is generated from the document ID and composed with the printing image of the document (2109). The composed printing image and the document information are registered in the policy server (2110).

Thus, the protected document is printed out.

Figure 22:
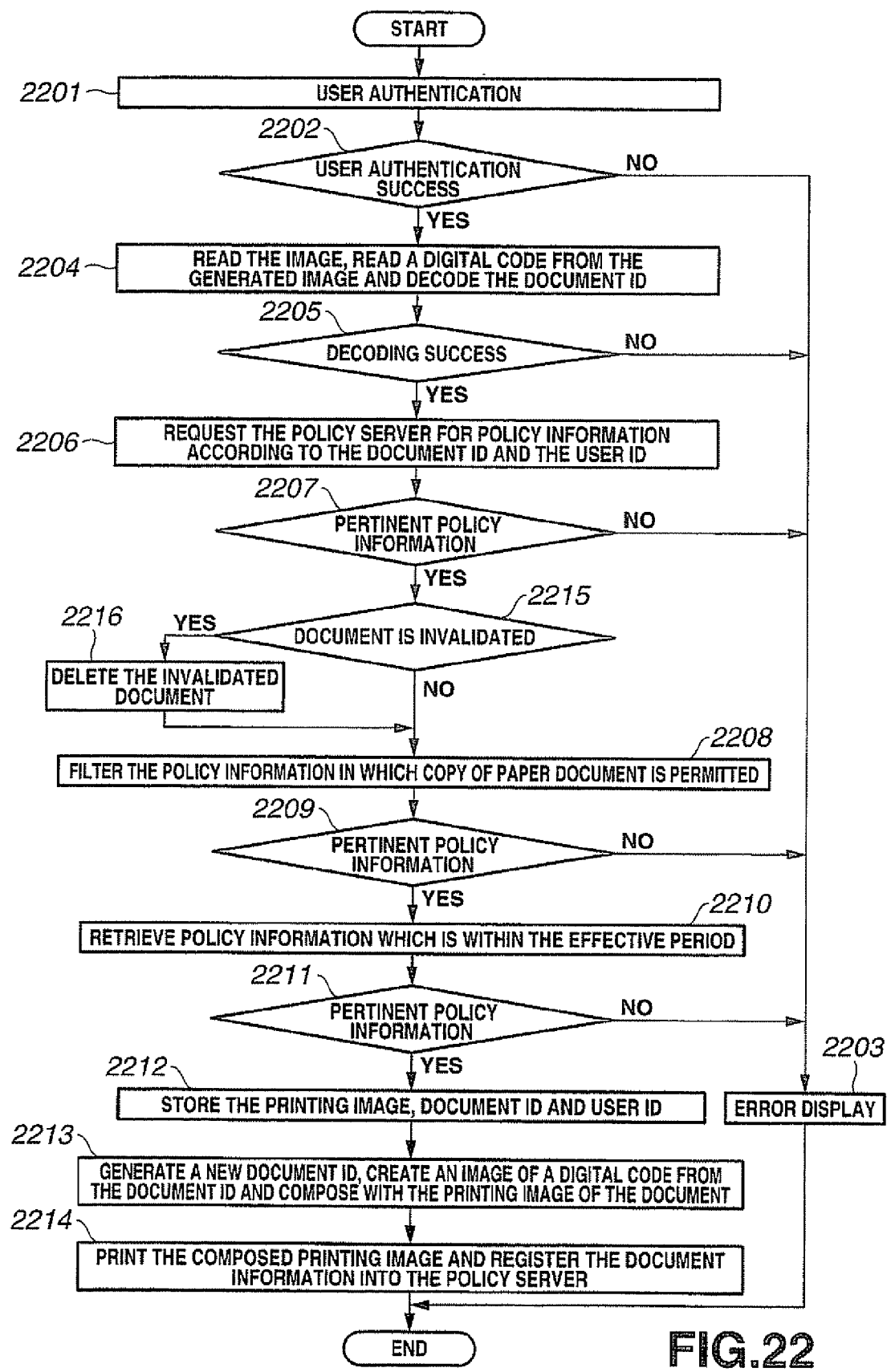
FIG. 22 is a flow chart showing a flow of processing to copy performed by the complex machine of the document management system according to the embodiment of the present invention.

FIG. 22 is a flow chart showing a flow of duplicating processing performed by the complex machine of the document management system according to an embodiment of the present invention.

In FIG. 22, a protected paper document is placed on the platen glass of the complex machine or an ADF, and a copy button is depressed to start processing. First, user authentication is performed (2201). It is judged whether or not the authentication is success (2202), and if could not be authenticated (NO in 2202), an error is shown (2203).

And, if could be authenticated (YES in 2202), the set protected paper document is read, the image is generated, and the document ID is read from the image and decoded (2204).

Thus, it is judged whether or not the document ID could be decoded (2205), and if could not be decoded (NO in 2205), that effect is shown (2203). If could be decoded normally (YES in 2205), a request for policy information according to the document ID and user ID is made to the policy server (2206).

It is judged whether or not there is policy information responded from the policy server (2207), and if there is no policy information (NO in 2207), an error is shown (2203). And, if there is policy information (YES in 2207), it is judged whether or not the object document is invalidated (2215), and if invalidated (YES in 2215), the document is deleted (2216). After the document is deleted, or if not invalidated (NO in 2215), policy information that "copy of paper document" is permitted is filtered (2208). Specifically, policy information that "copy of paper document" is designated in the permission function list item of policy information is retrieved.

As a filtered result, it is judged whether or not there is matched policy information (2209), and if there is policy information (YES in 2209), the policy information which is within the effective period is retrieved (2210).

It is judged whether or not there is policy information which is within the effective period (2211), and if there is no policy information (NO in 2211), it is shown that there is no pertinent policy information (2203). And, if there is policy information which is within the effective period (YES in 2211), the printing image, document ID and user ID whose printing is requested are stored (2212). A document ID is newly generated, and an image of digital code is generated from the document ID and composed with the printing image of the document (2213). The composed printing image and the document information are registered in the policy server (2214).

Figure 23:
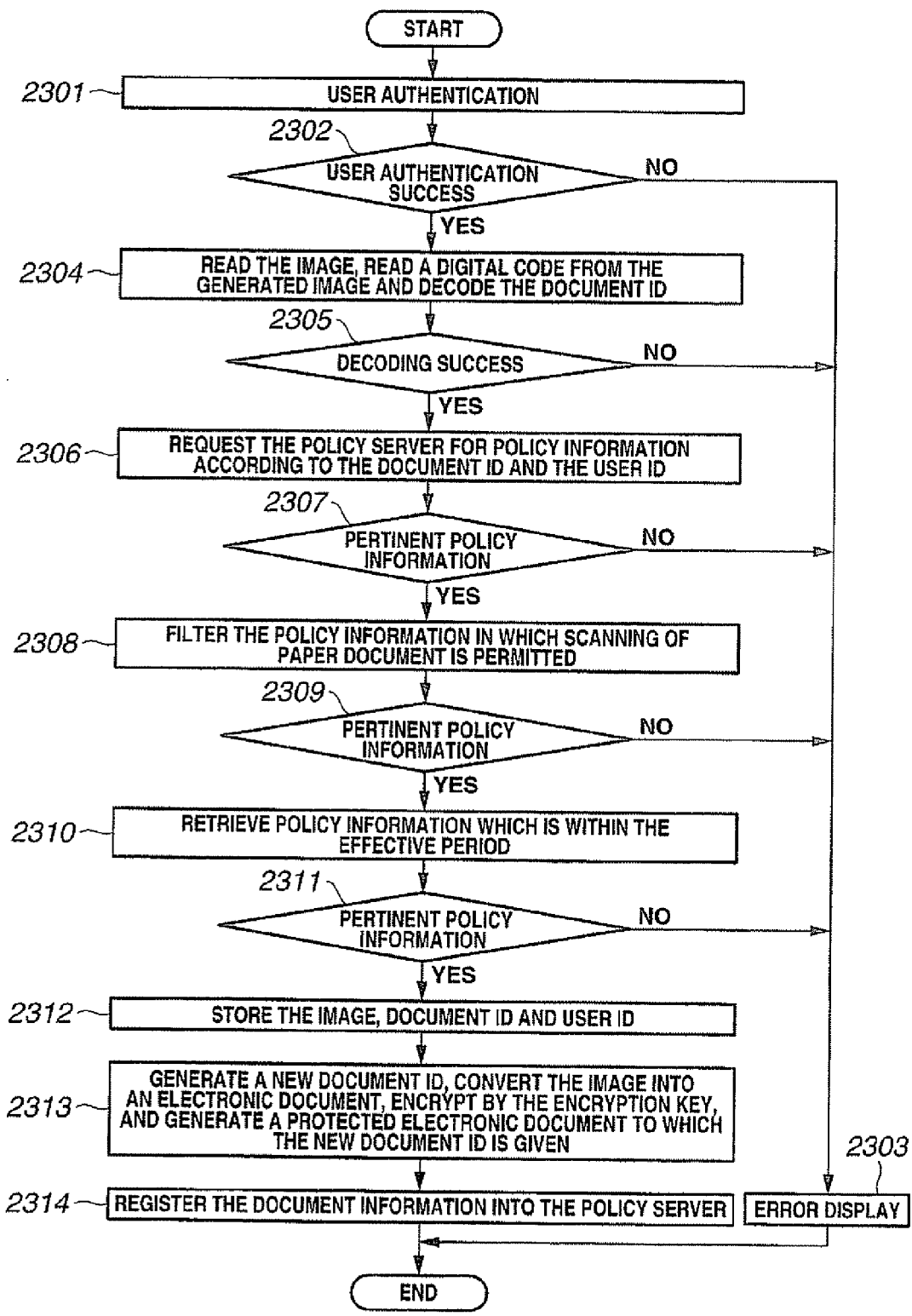
FIG. 23 is a flow chart showing a flow of processing to scan in order to create an electronic document from a paper document performed by the complex machine of the document management system according to the embodiment of the present invention.

FIG. 23 is a flow chart showing a flow of scanning processing to generate an electronic document from a paper document which is performed by the complex machine of the document management system according to an embodiment of the present invention.

In FIG. 23, the protected paper document is placed on the platen glass of the complex machine or an ADF, and the scan button is depressed to start processing. First, user authentication is performed (2301). And, it is judged whether or not the authentication was success (2302), and if could not be authenticated (NO in 2302) an error is shown (2303).

If could be authenticated (YES in 2302), the set protected paper document is read, the image is generated, and the document ID is read from the image and decoded (2304).

Thus, it is judged whether or not the document ID could be decoded (2305), and if could not be decoded (NO in 2305), that effect is shown (2303). If could be decoded normally (YES in 2305), a request for policy information according to the document ID and user ID is made to the policy server (2306).

It is judged whether or not there is policy information responded from the policy server (2307), and if there is no policy information (NO in 2307), an error is shown (2303). And, if there is policy information (YES in 2307), it is judged whether or not the object document has been invalidated (2315), and if invalidated (YES in 2315), the document is deleted (2316). After the document is deleted, or if not invalidated (NO in 2315), policy information that "scanning of paper document" is permitted is filtered (2308). Specifically, policy information that "scanning of paper document" is designated in the permission function list item of policy information is retrieved.

As a filtered results it is judged whether or not there is matched policy information (2309), and if there is policy information (YES in 29309), policy information which is within the effective period is retrieved (2310).

It is judged whether or not there is policy information which is within the effective period (2311), and if there is no policy information (NO in 2311), it is shown that there is no pertinent policy information (2303). If there is policy information which is within the effective period (YES in 2311), the read image, document ID and authenticated user ID are stored (2312). And a document ID is newly generated, the image is converted into an electronic document, the encryption key is used to encrypt, and a protected electronic document to which the new document ID is given is generated (2313). The protected electronic document is registered into the policy server (2314).

Figure 24:
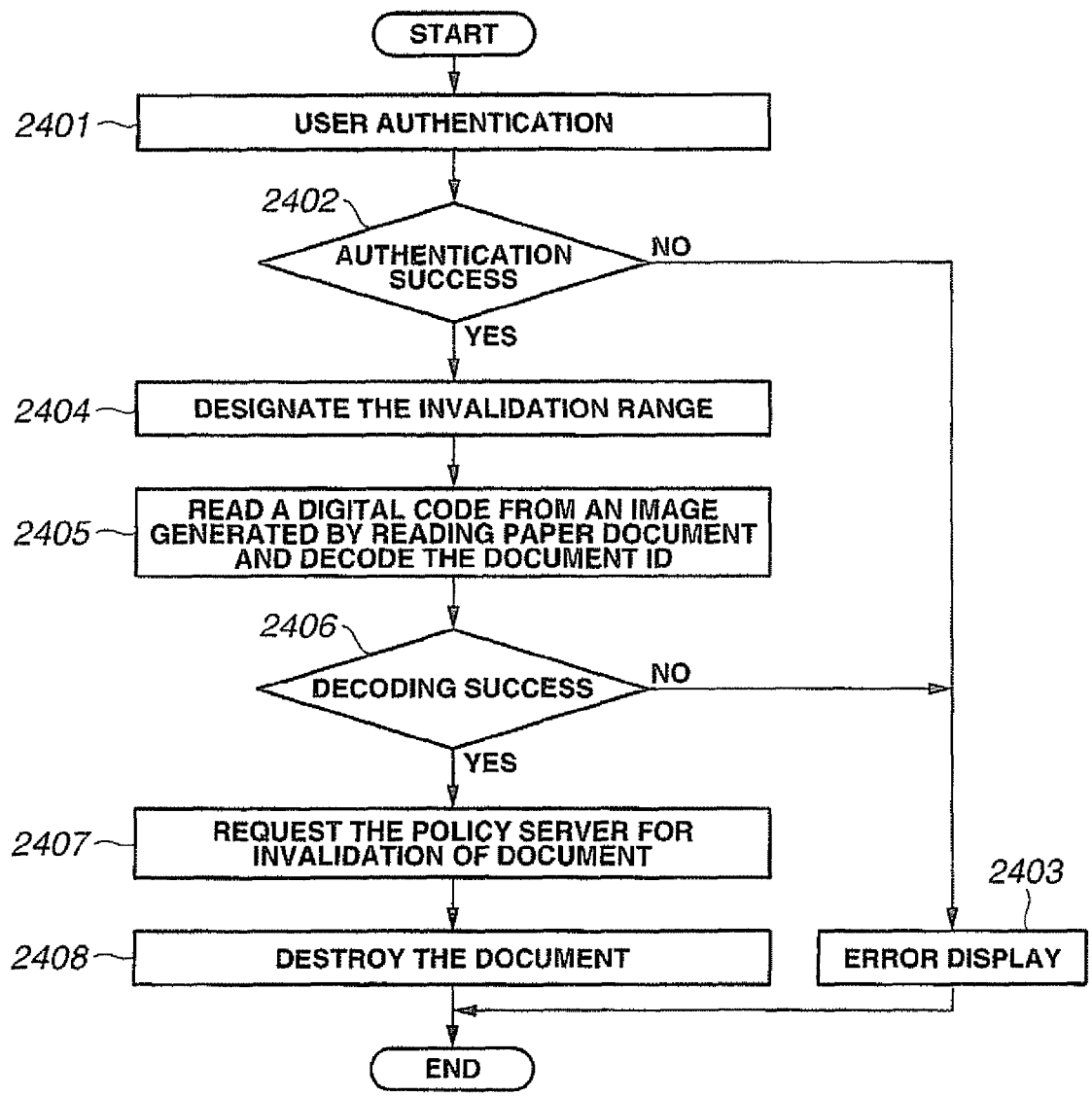
FIG. 24 is a flow chart showing a flow of processing to invalidate a protected paper document performed by the complex machine and the shredder of the document management system according to the embodiment of the present invention.

FIG. 24 is a flow chart showing a flow of processing to invalidate the protected paper document performed by the complex machine and the shredder of the document management system according to an embodiment of the present invention.

In FIG. 24, the protected paper document is placed on the platen glass or an ADF of the complex machine, and the invalidation button is depressed to start processing. For the shredder, the protected paper document is set at the document insertion opening to start processing.

First, user authentication is performed (2401). It is judged whether or not the authentication was success (2402), and if could not be authenticated (NO in 2402), an error is shown (2403). If the authentication was success (YES in 2402), the invalidation range of the protected paper document is designated (2404). As a method of designating the invalidation range, there are, for example, a method of designating by a user operation and a method of previously designating the invalidating range. Besides, in a case of the shredder, it is provided with a button, which is used to designate the document to be invalidated.

The invalidation range designated by the designation method is determined to be either only a document which is designated to the protected paper document or all protected documents which are related to the protected paper document. Especially, the shredder is provided with buttons for allowing their selection, and the user depresses any of them to designate an invalidation range.

When the invalidation range is designated, a digital code is read from an image generated by reading the paper document, and the document ID is decoded (2405). And, it is judged whether or not the decoding was success (2406), and if it was decoded normally (YES in 2406), invalidation of the document designated by the document ID is requested to the policy server (2407).

And, when invalidation of policy information on the document is set by the policy server; the document is destroyed (2408).

If it was failed to decode the document ID (NO in 2406), that effect is shown (2403), and the processing is terminated.

In a case of the complex machine, the paper document to be destroyed is stored in a special tray or destroyed by shredding by a co-disposed shredder. And, the shredder destroys the protected paper document by shredding.

It is configured as described above that the complex machine 400 destroys the document if the paper document is invalidated at the time of the operation of the paper document, and some of recent complex machines can directly process the electronic document.

For example, such a complex machine has a function to accumulate the electronic documents within it and to print or to perform facsimile transmission of them according to an instruction. In such a case, similar to the processing performed by the client PC, processing to read the document ID from the protected electronic document is performed within the complex machine to inquire of the policy server about the policy information, and if invalidated, the electronic document can be deleted from the storage device.

And, it is configured so that the policy server 100 receives the invalidation request from the external device but may be configured so that the policy server itself receives directly the invalidation request.

The embodiment of the present invention is not limited to this embodiment and also includes such a structure.

The present invention can also configure a document management system to perform the above-described processing by causing a document management system having a communication function to perform the above-described operation or installing a program, which configures the above-described means, into a computer from a recording medium (CD-ROM, DVD-ROM or the like) and executing. The computer configuring the document management system has a CPU (Central Processor Unit), a ROM (Read Only Memory), a RAM (Random Access Memory) and a hard disk connected through a system bus. The CPU has the RAM as a work area to perform processing according to the program stored in the ROM or the hard disk.

And, the medium for supplying the program may be a communication medium (a medium temporarily or fluidally holding a program such as a communication line or a communication system). For example, the program is posted on an electronic bulletin board (BBS: Bulletin Board Service) on a communication network and may be delivered through the communication line.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. A document management system, comprising:
a management device that manages operation limiting information for limiting an operation of a document, and
a document operation device that operates the document, wherein:
the document operation device is provided with:
an invalidation request portion that requests invalidation of the document, and
the management device is provided with:
an operation historical management portion that manages an operation history of a document for managing the operation limiting information,
a policy information setting portion that sets policy information of the document based on a policy ID, the policy information including usage permissions,
a related document retrieval portion that retrieves a related document related to the document according to the operation history managed by the operation historical management portion in response to the document invalidation request by the invalidation request portion, the policy ID of the document shared by the related document such that policy information of the related document follows the policy information of the document, and
an invalidation portion that:
sets invalidation information in operation limiting information on a document related to the invalidation request and a related document retrieved by the related document retrieval portion; and
invalidates the document related to the invalidation request and the related document.

2. The document management system according to claim 1, wherein:
the document operation device is provided with a range designation portion that designates an invalidation range of the document to be invalidated, and
the related document retrieval portion retrieves a related document belonging to the invalidation range designated by the range designation portion.

3. The document management system according to claim 2, further comprising a document shredding machine that shreds a document, wherein:
the document shredding machine includes a reading portion that reads the document identification information printed on a paper document when the paper document is shredded, and makes an invalidation request of a related document related to the document shown by the document identification information which is read by the reading portion to the management.

4. The document management system according to claim 2, wherein the related document retrieval portion retrieves a document related to the document according to a derived relationship of the document to be invalidated.

5. The document management system according to claim 1, wherein the related document retrieval portion retrieves a document related to the document according to a derived relationship of the document to be invalidated.

6. The document management system according to claim 1, further comprising the related document being paper, and the document being electronic.

7. A document management device, comprising:
a policy information setting portion that sets policy information of a document based on a policy ID, the policy information including usage permissions,
a related document retrieval portion that retrieves a related document related to the document in response to a document invalidation request, the policy ID of the document shared by the related document such that policy information of the related document follows the policy information of the document, and
a document invalidation portion that
sets invalidation information in management information on a document related to the invalidation request and the related document retrieved by the related document retrieval portion; and
invalidates the document related to the invalidation request and the related document.

8. The document management device according to claim 7, wherein the related document retrieval portion retrieves the related document according to an operation history of the document to be invalidated.

9. The document management device according to claim 8, wherein the related document retrieval portion retrieves the related document according to identification information for identifying an electronic document and a paper document.

10. The document management device according to claim 9, further comprising:
an invalidation request portion that designates an invalidation range of the document to be invalidated and makes the invalidation request, wherein:
the related document retrieval portion retrieves a related document belonging to the invalidation range designated by the invalidation request made by the invalidation request portion.

11. The document management device according to claim 8, further comprising:
an invalidation request portion that designates an invalidation range of the document to be invalidated and makes the invalidation request, wherein:
the related document retrieval portion retrieves a related document belonging to the invalidation range designated by the invalidation request made by the invalidation request portion.

12. The document management device according to claim 7, wherein the related document retrieval portion retrieves a document related to the document to be invalidated according to a derived relationship of the document to be invalidated.

13. The document management device according to claim 12, wherein the related document retrieval portion retrieves the related document according to identification information for identifying an electronic document and a paper document.

14. The document management device according to claim 13, further comprising:
an invalidation request portion that designates an invalidation range of the document to be invalidated and makes the invalidation request, wherein:
the related document retrieval portion retrieves a related document belonging to the invalidation range designated by the invalidation request made by the invalidation request portion.

15. The document management device according to claim 12, further comprising:
an invalidation request portion that designates an invalidation range of the document to be invalidated and makes the invalidation request, wherein:
the related document retrieval portion retrieves a related document belonging to the invalidation range designated by the invalidation request made by the invalidation request portion.

16. The document management device according to claim 7, wherein the related document retrieval portion retrieves the related document according to identification information for identifying an electronic document and a paper document.

17. The document management device according to claim 16, further comprising:
an invalidation request portion that designates an invalidation range of the document to be invalidated and makes the invalidation request, wherein:
the related document retrieval portion retrieves a related document belonging to the invalidation range designated by the invalidation request made by the invalidation request portion.

18. The document management device according to claim 7, further comprising:
an invalidation request portion that designates an invalidation range of the document to be invalidated and makes the invalidation request, wherein:
the related document retrieval portion retrieves a related document belonging to the invalidation range designated by the invalidation request made by the invalidation request portion.

19. A document management method, comprising:
managing operation limiting information that limits an operation of a document,
requesting invalidation of the document,
managing an operation history of a document managing the operation limiting information,
setting policy information of the document based on a policy ID, the policy information including usage permissions,
retrieving a related document related to the document from the managing operation history in response to the document invalidation request, the policy ID of the document shared by the related document such that policy information of the related document follows the policy information of the document,
setting invalidation information in operation limiting information on a document related to the invalidation request and the retrieved related document, and
invalidating the document related to the invalidation request and the related document.

20. A non-transitory computer readable recording medium storing a document management program which causes a computer to perform a document management process, wherein:
the process comprises:
setting policy information of a document based on a policy ID, the policy information including usage permissions,
retrieving a related document related to the document in response to a document invalidation request, the policy ID of the document shared by the related document such that policy information of the related document follows the policy information of the document,
setting invalidation information in management information of the document related to the invalidation request and the retrieved related document, and
invalidating the document related to the invalidation request and the related document.

21. A document management system, comprising:
a management device that manages operation limiting information for limiting an operation of a document, and
a document operation device that operates the document, wherein:
the document operation device is provided with:
an invalidation request portion that requests invalidation of the document, and
the management device is provided with:
an operation historical management portion that manages an operation history of a document for managing the operation limiting information,
a policy information setting portion that sets policy information related to the document based on a policy ID, the policy information including usage permissions,
a related document retrieval portion that retrieves a related document related to the document according to the operation history managed by the operation historical management portion in response to the document invalidation request by the invalidation request portion, the related document having a document ID associated with the policy ID, wherein the related document follows usage permissions associated with the document ID and the policy ID, such that policy information of the related document follows the policy information of the document, and
an invalidation portion that:
sets invalidation information in operation limiting information on a document related to the invalidation request and a related document retrieved by the related document retrieval portion; and
invalidates the document related to the invalidation request and the related document.

* * * * *